US012715667B2

(12) United States Patent
Robinson et al.

(10) Patent No.: US 12,715,667 B2
(45) Date of Patent: Aug. 25, 2026

(54) THERMOPLASTIC BALING STRAP

(71) Applicant: D R Baling Wire Manufacturers Limited, Sheffield (GB)

(72) Inventors: Peter James Robinson, Sheffield (GB); Matthew David Robinson, Sheffield (GB); John Mills, Littleborough (GB)

(73) Assignee: D R Baling Wire Manufacturers Limited (GB)

( * ) Notice: Subject to any disclaimer, the term of this patent is extended or adjusted under 35 U.S.C. 154(b) by 126 days.

(21) Appl. No.: 18/429,788

(22) Filed: Feb. 1, 2024

(65) Prior Publication Data

US 2025/0236445 A1 Jul. 24, 2025

(51) Int. Cl.
*B65D 63/10* (2006.01)
*B29C 48/00* (2019.01)
(Continued)

(52) U.S. Cl.
CPC ............ *B65D 63/10* (2013.01); *B29C 48/022* (2019.02); *B29C 48/05* (2019.02); *B29C 48/793* (2019.02);
(Continued)

(58) Field of Classification Search
CPC .... B65D 63/10; B65D 2563/10; B65D 63/12; B29C 48/022; B29C 48/05; B29C 48/793; C08K 5/3417; C08L 23/06; C08L 67/06; C08L 2207/20; C08L 67/02; C08L 23/04; C08L 67/03; B29K 2023/06; B29K 2067/003; B29L 2031/7276; B65B 13/26; C08G 63/605; A01F 15/14
See application file for complete search history.

(56) References Cited

U.S. PATENT DOCUMENTS 3,137,990 A 6/1964 Carranza
3,315,454 A 4/1967 Carranza
(Continued)

FOREIGN PATENT DOCUMENTS

CA 729930 3/1966
CN 201362431 Y 12/2009
(Continued)

OTHER PUBLICATIONS

Deltex Vinyard Wire Sep. 13, 2017 (03 sheets) x 01.
(Continued)

*Primary Examiner* — David M Upchurch
(74) *Attorney, Agent, or Firm* — Clark Hill PLC; James R. Foley

(57) ABSTRACT

A novel thermoplastic baling wire suitable for baling waste destined for either recycling or for refuse derived fuel, having recyclable properties and good self-knotting properties comprises recycled thermoplastic material is polyethylene terephthalate comprising 6%±2% by weight of polyethylene. A method of manufacture of said baling wire comprises preparing a masterbatch of recycled polyethylene terephthalate (rPET) including one or more multi-functional acrylic oligomers to obtain a modified recycled polyethylene terephthalate; combining said modified rPET with a phthalocyanine based nucleating agent; transitioning said modified rPET from molten to solid state; and extruding said modified rPET material into an elongate band.

26 Claims, 17 Drawing Sheets

(51) Int. Cl.

| | |
|---|---|
| ***B29C 48/05*** | (2019.01) |
| ***B29C 48/793*** | (2019.01) |
| ***C08K 5/3417*** | (2006.01) |
| ***C08L 23/06*** | (2006.01) |
| ***C08L 67/06*** | (2006.01) |
| *B29C 48/02* | (2019.01) |
| *B29C 48/79* | (2019.01) |
| *B29K 67/00* | (2006.01) |
| *B29L 31/00* | (2006.01) |
| *C08K 5/34* | (2006.01) |

(52) U.S. Cl.

CPC ............ *C08K 5/3417* (2013.01); *C08L 23/06* (2013.01); *C08L 67/06* (2013.01); *B29K 2023/06* (2013.01); *B29K 2067/003* (2013.01); *B29L 2031/7276* (2013.01); *B65D 2563/10* (2013.01); *C08L 2207/20* (2013.01)

(56) References Cited

U.S. PATENT DOCUMENTS

| | | | | |
|---|---|---|---|---|
| 3,332,228 | A | 7/1967 | Chill | |
| 3,780,401 | A | 12/1973 | Reimer | |
| 3,914,823 | A * | 10/1975 | Hara | B65D 63/1018 403/346 |
| 3,962,508 | A | 6/1976 | Nakanose | |
| 4,981,631 | A | 1/1991 | Cheung et al. | |
| 5,105,222 | A | 4/1992 | Ohta et al. | |
| 5,641,549 | A | 6/1997 | Johnston et al. | |
| 7,118,648 | B2 | 10/2006 | Dever et al. | |
| 2002/0170155 | A1 | 11/2002 | Shilale | |
| 2007/0186388 | A1 | 8/2007 | Rome | |
| 2010/0146743 | A1 | 6/2010 | Rome | |
| 2012/0279023 | A1 | 11/2012 | Burout et al. | |
| 2016/0272392 | A1 | 9/2016 | Robinson | |

FOREIGN PATENT DOCUMENTS

| | | | |
|---|---|---|---|
| CN | 102093679 | A | 6/2011 |
| CN | 103910931 | A | 7/2014 |
| CN | 105542425 | A | 5/2016 |
| CN | 107325500 | A | 11/2017 |
| CN | 112521729 | A | 3/2021 |
| EP | 0 649 874 | A2 | 4/1995 |
| EP | 1704987 | A1 | 9/2006 |
| FR | 2563200 | A1 | 10/1985 |
| GB | 1092178 | A | 11/1967 |
| GB | 2 172 601 | A | 9/1986 |
| GB | 2 510 985 | A | 8/2014 |
| GB | 2533980 | A | 7/2016 |
| WO | 03023928 | A1 | 3/2003 |
| WO | 2013 059555 | A1 | 4/2013 |
| WO | 2018/014943 | A1 | 1/2018 |

OTHER PUBLICATIONS

Chain extension and branching of polyethyleneterephthalate (PET) with dye and multifunctional epoxy or isocyanate additives: an experimental and modelling study—reactive and functional polymers, vol. 72, issue 1, Jan. 2012, pp. 50-60.

European Search Report Opinion dated Sep. 11, 2024.

European Search Report dated Jun. 25, 2024.

* cited by examiner

THERMOPLASTIC BALING STRAP

FIELD OF THE INVENTION

The present invention relates to a thermoplastic baling strap, and to a method and apparatus for the manufacture thereof.

BACKGROUND OF THE INVENTION

In the United Kingdom, approximately 85% of household waste is processed of which 45% is recycled, with the remaining waste being incinerated or sent to landfill. Around 2.5 million metric tonnes of plastics waste is generated each year comprising up to 100 billion individual plastics items.

Around 4 to 5 million tonnes of refuse waste are incinerated in the UK each year to generate electrical power in the form of refuse derived fuel (RDF). RDF may also be shipped abroad for incineration. RDF comprises biodegradable items such as paper as well as plastics materials. Traditionally to reduce bale volume for transport and storage, RDF was compressed under a force of around 100 tonnes into bales and held together with steel wire straps. The bales are covered in plastic to trap odors and also to keep the moisture content of the RDF stable during storage and transportation because the ingress of water can reduce the combustion efficiency of the RDF.

However, it is a limitation of steel baling wires that they must be removed from compressed bales prior to incineration of the RDF both to recycle the steel wire and to prevent the steel wire damaging and/or reducing the efficiency of the incinerator. This is labor intensive and costly. Removal of the wires also results in loose waste which must be loaded into an incinerator using a bulldozer or other mechanical handling equipment. Feeding loose RDF into incinerators created problems controlling burn rate. The process of manufacturing steel wire is also detrimental to the environment with 1 tonne of steel wire generating approximately 3 tonnes of $CO_2$ emissions. The transportation of bulk RDF to the incineration site also generates further $CO_2$ emissions, as well as being expensive.

The use of thermoplastic baling straps as an alternative to steel wire for baling RDF waste prior to incineration is known.

In the United Kingdom:

- RDF bales are made-up of plastics and biodegradable materials but exclude non-combustible materials such as metal and glass. Bales which are destined for use as RDF are bound using either metal wire, which means the bales must be broken open prior to incineration, or are bound using thermoplastics wire, in which case the bales can be put into the incinerator whole, with advantages for burn consistency;
- waste intended for recycling undergoes processes including (1) collection and distribution; (2) sorting and categorizing; (3) washing; (4) shredding; (5) identification and separation of plastics; and (6) extruding and compounding. Bales of plastics only material are bound using metal wire, which needs to be removed before the plastics materials are sorted.

Referring to FIG. 1*a* herein, there is illustrated a shipment consisting of a plurality of known bales of plastics waste materials, including common household plastics, bottles, containers, packaging, plastic sheeting and the like loaded onto a truck for shipment to either a recycling facility or to an incinerator facility. The bales of plastics can be destined either for recycling, or for incineration as refuse derived fuel (RDF).

The bales 100 are under compression and are tied with baling wire 101. Known bales can be cylindrical or rectangular, with a typical rectangular bale having dimensions of 2 m width, 1.5 m height and a depth 1.5 m. The known bale is compressed in a baling machine, under a ram force of up to 120 tonnes and wrapped with a plurality of straps which hold the compressed bales together.

As shown in FIG. 1*b*, there is illustrated schematically a known compressed RDF bale, held together with a plurality of stainless-steel straps, and which has been wrapped in a plastics sheet material to keep out moisture and rain, and to prevent small pieces of RDF from dropping off the bales during transit. Typically, between 4 and 8 individual baling wire straps are used per bale. For metal straps, the straps may be fastened by pre-forming a loop in a first end of the metal strap, pulling the second loose end of the strap through the loop and wrapping it back around itself 102 or by self-tying two loose ends of the wire around one another for example 103.

It is a limitation of the stainless-steel wires that they must be cut and removed prior to incineration of RDF waste to recover the steel wire for recycling and to prevent the steel wire damaging and/or reducing the efficiency of the incinerator. When the wire is cut, the bales unfold and it is necessary to manipulate loose waste using a bulldozer or similar mechanical handling equipment. It is difficult to control the burn rate of incinerators by feeding in loose RDF, since the quantity of RDF fed into the incinerator is difficult to control and consequently the rate of production of power at RDF burning power stations has limits on its controllability.

To date the prior art thermoplastic baling straps could not be used for the 45% of waste sent for recycling as they were not recyclable due to their high carbon content (approx. 1-5% carbon) which causes the thermoplastic baling strap to be black in color and which does not enable the plastics baling wire to be sorted using the near infra-red (NIR) technology widely used in plastics recycling. The carbon black is included to increase the tensile strength of the plastics material to be comparable with the equivalent steel baling wire. It is a further problem with thermoplastic baling straps containing carbon that they can be brittle at low temperatures. Consequently, waste which is recycled is typically still baled and bound by steel wire, incurring high $CO_2$ emissions during manufacture of the steel wire and requiring removal of the steel wire prior to recycling.

SUMMARY OF THE INVENTION

The inventors have devised an improved, recyclable, thermoplastic baling strap which can be used to bale plastics refuse for either recycling or incineration, and which is more stable at low temperatures than prior art thermoplastics baling wires.

The recyclable thermoplastic baling strap disclosed herein provides an alternative solution to the known thermoplastic baling straps by offering greater stability at low temperatures which reduces its brittleness.

Advantageously the improved thermoplastics baling wire is fully recyclable. This is due to the presence of 6%±2% polyethylene by weight which increases the glass-liquid transition of the thermoplastics, so the extruded end-product is more stable at lower temperatures. Polyethylene is a thermoplastic polymer having a variable crystalline structure and is widely used in the plastics industry. Polyethylene functions as a dispersant and confers a degree of hydrophobic character to the plastics material allowing enhanced processing of the material.

Advantageously, the improved recyclable thermoplastic baling strap of the present invention is more stable at low temperatures which makes it less brittle, which improves tying of the wire around a bale, and reduces breakages.

The improved thermoplastics baling wire can be fed directly into incinerators, rather than having to break open the RDF bales which results in loose RDF to feed into an incinerator.

The improved recyclable baling wire allows waste to be baled and stored prior to deciding the fate of the bale i.e., incineration or processing as recycled plastics. This prevents the need for two separate baling wires with the known high carbon content thermoplastic wire typically being used for incineration and the known steel wire currently being used for waste which is processed for recycling.

Unlike known thermoplastics baling wires, the improved recyclable baling wire of the present invention does not require drying prior to extrusion and is also easier to extrude due to its increased glass-liquid transition temperature, so energy costs incurred in the extrusion of the improved recyclable thermoplastics baling wire are lower than those incurred with prior art high carbon content thermoplastic baling wires.

The improved recycled thermoplastic baling wire also significantly reduces the quantity of $CO_2$ emissions which would otherwise be incurred by the manufacture of steel wire.

It is a further advantage of the recyclable baling wire of the present invention that it contains a visual or infra-red detectable dye or pigment allowing it to be readily identified by automated pickers e.g., NIR pickers used in waste processing plants such that it can be selectively removed and further recycled.

Specific embodiments according to the present invention aim to provide a means of baling up refuse derived fuels with a recyclable thermoplastics baling strap which can be fed directly into an incinerator without the need to open the bales prior to incineration to separate off the baling wire.

According to a first aspect of the present invention there is provided a thermoplastic polymer composition (ePET) suitable for use in the manufacture of a thermoplastic baling strap;

said thermoplastic polymer comprising polyethylene terephthalate (PET) and 6%±2% by weight of polyethylene.

Preferably, said polyethylene terephthalate comprises recycled polyethylene terephthalate (rPET).

Preferably, the thermoplastic polymer composition comprises 7% by weight of polyethylene plus or minus 1%.

Preferably, the thermoplastic polymer composition comprises 7% by weight of polyethylene.

According to a second aspect of the invention, there is provided a masterbatch composition suitable for use in the manufacture of a thermoplastic baling strap comprising:

polyethylene terephthalate (PET);

one or more multifunctional acrylic oligomers;

at least one Phthalocyanine-based nucleating agent; and high flow polyethylene.

Said polyethylene terephthalate may comprise amorphous polyethylene terephthalate (aPET), which is previously unused and has not been recycled (also called virgin PET).

Preferably the polyethylene terephthalate comprises recycled polyethylene terephthalate (rPET).

Preferably, said one of more multifunctional acrylic oligomers are present in 8% to 12% by weight in the masterbatch.

Preferably, said at least one Phthalocyanine-based nucleating agent are present in 8% to 12% by weight.

Preferably, the one or more multi-functional acrylic oligomers are selected from the set hydroxylpropyl methacrylate, 2-hydroxyl propyl methacrylate, benzoylated hydroxylpropyl methacrylate.

Advantageously, the at least one Phthalocyanine-based nucleating agent is Phthalocyanine Green or Phthalocyanine Green 7.

Preferably, the high flow polyethylene is present in proportion 0.5% by weight.

Preferably, the high flow polyethylene is a Polyethylene wax.

According to a third aspect of the invention, a novel thermoplastic polymer composition (ePET') suitable for use as a thermoplastic baling strap is provided;

said novel thermoplastic polymer composition (ePET') comprising 98-99% by weight of (polyethylene terephthalate and polyethylene) (ePET) and 1 to 2% by weight of masterbatch according to any of this second aspect of the invention.

Preferably said polyethylene terephthalate comprising said ePET is recycled polyethylene terephthalate (rPET).

The invention includes a baling strap having a thermoplastic polymer composition comprising 98-99% by weight of (ePET) and 1 to 2% by weight of masterbatch according to any of this second aspect of the invention.

Preferably, the thermoplastic baling stap comprises a single length of flexible elongate thermoplastic material.

Advantageously, the thermoplastic baling strap is capable of being formed into a knot by twisting said baling strap.

Advantageously, the thermoplastic baling strap has strength and ductility sufficient to be capable of being tied or twisted into a self-tying knot by a mechanism on a baling machine without breaking.

Advantageously, the thermoplastic baling strap has mechanical properties which allow it to be cold-friction welded to itself under sufficient tension & compression.

Preferably, the said single length of elongate thermoplastic material of the thermoplastic baling strap has an outer surface formed with a plurality of externally facing surface undulations extending along said elongate band;

said plurality of surface undulations providing said flexible elongate band with a gripping surface; and said plurality of externally facing surface undulations extending along said single length of flexible elongate band prevent adjacent parts of the band within the knot from slipping with respect to each other when said baling strap is formed into a knot.

Preferably, the thermoplastic baling strap comprises:

a first set of surface undulations extending along a first surface of said elongate band;

a second set of surface undulations extending along a second surface of said elongate band;

wherein said first and second surfaces are on opposite sides of said elongate band.

Preferably, the first and second sets of surface undulations are spaced apart from each other around a circumference of said elongate band.

Preferably, the surface undulations comprise ribbed undulations extending in a direction transverse to a main length of said elongate band.

Preferably, the surface undulations of one part of said strap operate in use to grip a surface of another part of said strap, or part of another strap, when said strap is knotted with itself, or with said part of another strap.

Preferably, the undulations comprise a plurality of recessed portions and a plurality of protruding portions.

Alternatively, the undulations comprise a plurality of alternating ridges and valleys.

Preferably, the undulations repeat at a distance in the range 0.83 to 1.25 undulations per millimetre of length of said strap.

According to a fourth aspect of the invention there is provided a method of manufacture of a thermoplastic baling strap said thermoplastic baling strap comprising:

- a single length of flexible elongate thermoplastic material;
- wherein said thermoplastic baling strap has a novel thermoplastic polymer composition (ePET') comprising 98-99% by weight of (ePET) and 1 to 2% by weight of masterbatch;
- wherein said ePET comprises polyethylene terephthalate (PET) and 6%+−2% by weight of polyethylene;
- wherein said masterbatch comprises:
  - polyethylene terephthalate (PET)
  - one or more multifunctional oligomers
  - at least one Phthalocyanine based nucleating agent; and
  - high flow polyethylene
- said method comprising:
- preparing a masterbatch of polyethylene terephthalate (PET) including one or more multi-functional acrylic oligomers to obtain a modified polyethylene terephthalate;
- combining said modified PET with a phthalocyanine based nucleating agent;
- transitioning said modified PET from molten to solid state; and
- extruding said modified PET material into an elongate band.

The polyethylene terephthalate may comprise amorphous previously unused polyethylene terephthalate.

Preferably said polyethylene terephthalate is recycled polyethylene terephthalate (rPET).

Preferably, in the method of manufacture of a thermoplastic baling strap recycled polyethylene terephthalate comprises 7% by weight of polyethylene.

Preferably, the one or more multi-functional acrylic oligomers are selected from the set hydroxylpropyl methacrylate, 2-hyrdoxylpropyl methacrylate, benzoylated hydroxylpropyl methacrylate.

Preferably, the phthalocyanine based nucleating agent is selected from the set: Phthalocyanine Green G, Phthalocyanine Green 7.

Preferably in the method of manufacture of a thermoplastic baling strap said transitioning of said modified rPET is controlled to solidify/solidifies at a temperature of between 220° C. to 260° C.

Preferably in the method of manufacture of a thermoplastic baling strap said transitioning of said modified rPET is controlled to solidify/solidifies over a time period of between 20 and 35 seconds dependant on the external conditions at ambient temperature.

Preferably, in the method of manufacture of a thermoplastic baling strap said elongate band of modified rPET is extruded through a die under a tension of between 90 and 110 lbf/in$^2$.

Advantageously, in the method of manufacture of a thermoplastic baling strap said elongate band of modified rPET is extruded through a die under a pull force of between 320 and 400 N/mm.

Preferably the method of manufacture of a thermoplastic baling strap comprises passing said extruded elongate band, through a set of rollers to shape said elongate band to form a baling strap.

Preferably. the method of manufacture of a thermoplastic baling strap further comprises passing said extruded elongate band through a said set of rollers having a surface comprising a plurality of undulations, so as to impress on said elongate band a plurality of surface undulations.

Preferably, in the method of manufacture of a thermoplastic baling strap said rollers have a surface comprising a plurality of undulations, which act to impress on said elongate band a plurality of said surface undulations.

According to a fifth aspect of the invention there is provided an apparatus for manufacture of a thermoplastic baling strap, capable of being tied into a self-tying knot by a mechanism on a baling machine, said strap comprising:

- a single length of flexible elongate thermoplastic material;
- wherein said thermoplastic baling strap has a novel thermoplastic polymer composition (ePET') comprising 98-99% by weight of (ePET) and 1 to 2% by weight of masterbatch;
- wherein said ePET comprises polyethylene terephthalate (PET) and 6%+−2% by weight of polyethylene;
- wherein said masterbatch comprises:
  - polyethylene terephthalate (PET)
  - one or more multifunctional oligomers
  - at least one Phthalocyanine based nucleating agent; and
  - high flow polyethylene
- said apparatus comprising:
- a heating chamber for heating a masterbatch of said polyethylene terephthalate;
- an extrusion die for extruding said heated thermoplastic cable into an extruded strap; and
- a set of one or more impression rollers for applying a set of undulations to an outer surface of said extruded strap.

Preferably, said bulk polyethylene terephthalate as combined with polyethylene comprises recycled polyethylene terephthalate.

Preferably, said polyethylene terephthalate as used in said masterbatch comprises recycled polyethylene terephthalate (rPET).

Preferably one or more multi-functional acrylic oligomer's are selected from the set hydroxylpropyl methacrylate, 2-hyrdoxylpropyl methacrylate, benzoylated hydroxylpropyl methacrylate.

Preferably a phthalocyanine based nucleating agent is selected from the set: Phthalocyanine Green G, Phthalocyanine Green 7.

Preferably, the said extrusion die is set to extrude said heated thermoplastic cable at a pressure of between 90 and 110 lbf/in$^2$ [620-758 kPa].

Preferably the die pressure is set to a pressure of between 50 and 70 lbf/in$^2$ [344-483 kPa].

Preferably, in the apparatus said heating chamber is set to a temperature of between 26° and 290° C.

Preferably, modified rPET is controlled to solidify at a temperature of between 220° C. to 260° C.

Preferably, modified rPET is controlled to solidify over a time period of between 20 and 35 seconds dependent on the external conditions at ambient temperature.

Preferably, in the apparatus said impression rollers are configured to apply a pattern of externally facing surface undulations extending along said elongate band.

Preferably, in the apparatus said one or more impression rollers are configured to impress said elongate band so as to apply:

- a first set of surface undulations extending along a first surface of said elongate band; and
- a second set of surface undulations extending along a second surface of said elongate band;
- wherein said first and second surfaces are on opposite sides of said elongate band.

Preferably, in the apparatus said first and second sets of surface undulations are spaced apart from each other around a circumference of said elongate band.

Preferably, in the apparatus said rollers apply surface undulations comprising ribbed undulations extending in a direction transverse to a main length of said elongate band.

According to a sixth aspect there is provided a novel thermoplastic polymer composition (ePET') suitable for use as a thermoplastic baling strap comprising:

- 98-99% by weight of a thermoplastic polymer composition (ePET) comprising polyethylene terephthalate (PET) and 6%±2% by weight of polyethylene; and
- 1 to 2% by weight of a masterbatch composition comprising: recycled polyethylene terephthalate (rPET); one or more multifunctional acrylic oligomers; at least one Phthalocyanine-based nucleating agent; and high flow polyethylene.

According to a seventh aspect there is provided a thermoplastic baling strap, capable of being fastened by a baling machine, said thermoplastic baling strap having a thermoplastic polymer composition (ePET') comprising:

- 98-99% by weight of a thermoplastic polymer composition (ePET) comprising polyethylene terephthalate (PET) and 6%±2% by weight of polyethylene; and
- 1 to 2% by weight of a masterbatch composition comprising: polyethylene terephthalate (PET); one or more multifunctional acrylic oligomers; at least one Phthalocyanine-based nucleating agent; and high flow polyethylene.

The strap may be fastened to itself either by friction welding to itself, or by forming a knot and has dimensions and mechanical properties of ductility and strength sufficient to enable the strap to reliably bind a refuse bale without breaking.

Other aspects are as set out in the claims herein.

BRIEF DESCRIPTION OF THE DRAWINGS

For a better understanding of the invention and to show how the same may be carried into effect, there will now be described by way of example only, specific embodiments, methods and processes according to the present invention with reference to the accompanying drawings in which.

DETAILED DESCRIPTION OF THE EMBODIMENTS

There will now be described by way of example a specific mode contemplated by the inventors. In the following description numerous specific details are provided to aid a thorough understanding of the invention. It will be apparent, to one skilled in the art, that the present invention may be practiced without limitation to these specific details. In other instances, well-known methods and structures have not been described in detail so as not to unnecessarily obscure the description.

In this specification, the terms “cable”, “wire”, “strap”, “strip” and “band” are used interchangeably to denote an elongate flexible member made from any one of a range of materials including but not limited to, metals, and/or plastics materials and/or thermoplastics material.

In the specification, the terms “cable”, “strap”, “wire”, “strip” and “band” are used interchangeably to refer to the same thing.

In the specification, the term “thermoplastic” will be understood to mean any plastics polymer material that can be melted and recast, solidifying upon cooling, almost indefinitely i.e. a polymer which can be softened through heating before being processed and then left to cool and harden.

Polyethylene terephthalate (PET) is a plastics material frequently used in the manufacture of water bottles, food packaging, and other single use products. PET is made from virgin plastic and as such utilises fossil fuels. Recycled polyethylene terephthalate (rPET) will be understood to refer to PET which has been recycled and made into new products. PET can be recycled by cleaning and processing of used PET products, thus reducing the amount of plastic which ends up in landfill.

Figures 1A, 1B:
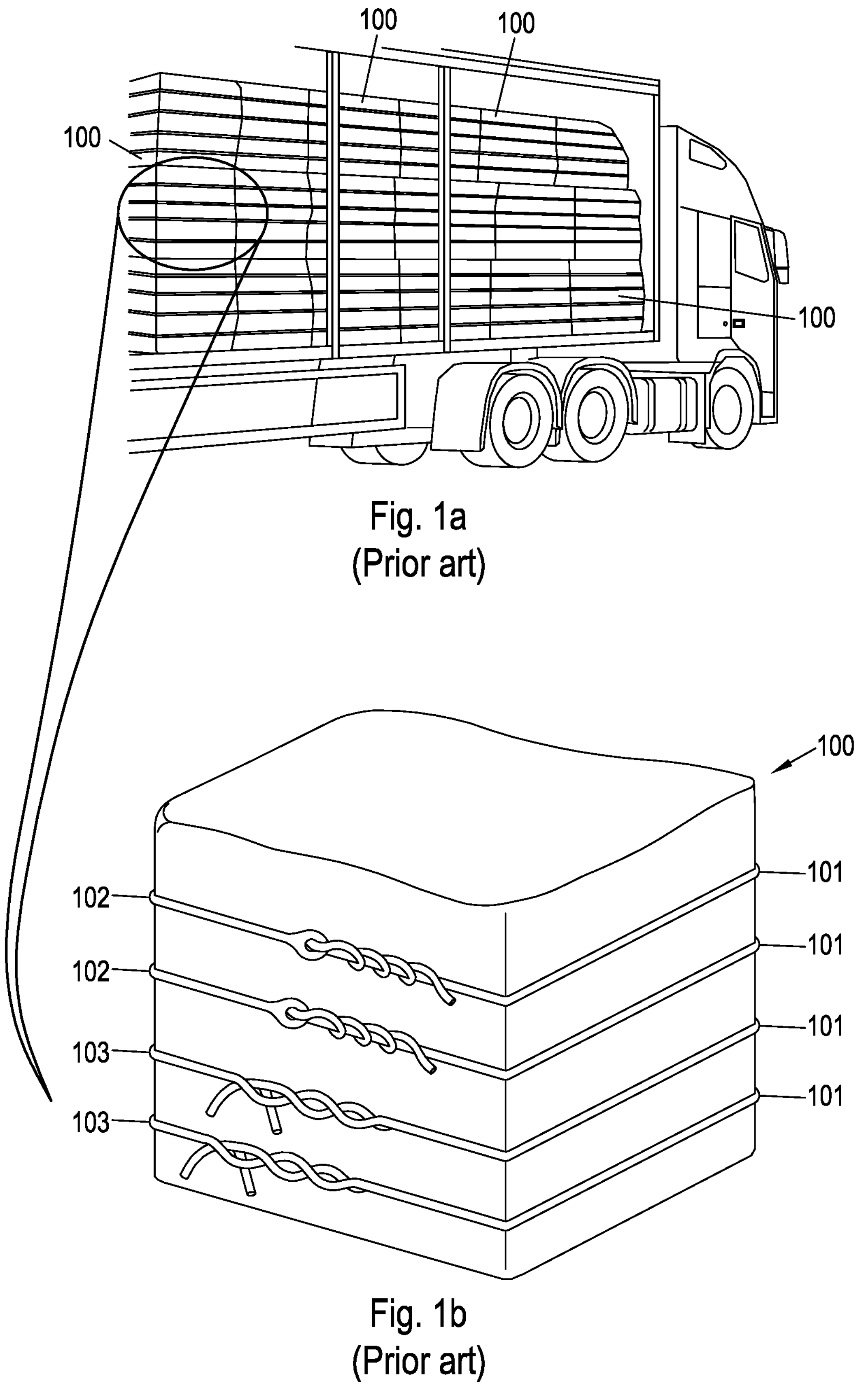
FIG. 1*a* herein illustrates schematically a lorry filled with conventional RDF bales, compressed and wrapped with plastic sheeting and tied by steel wire.
FIG. 1*b* herein illustrates schematically a known bale of plastics waste bound by the prior art steel wire, showing two variations of securing the wire around the bale.
Figure 2:
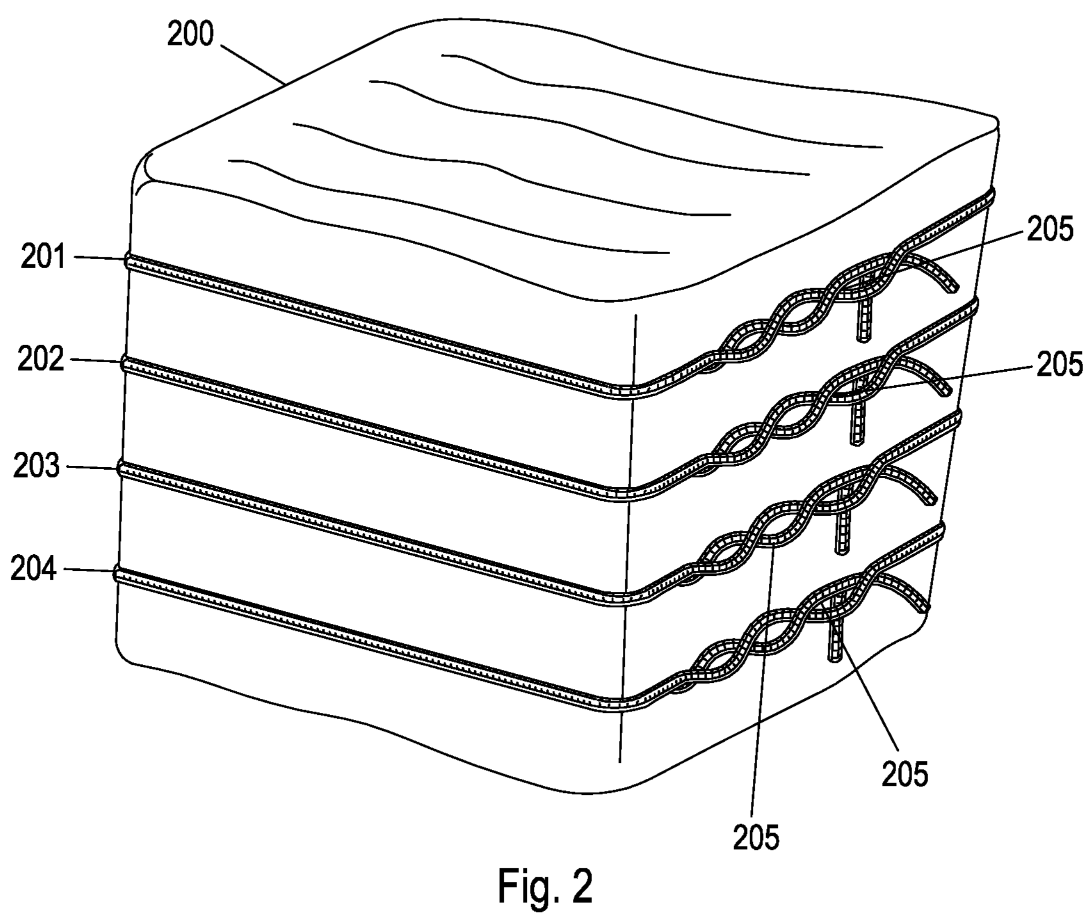
FIG. 2 herein illustrates schematically a bale of plastics refuse material bound by multiple lengths of novel recyclable thermoplastic baling strips each according to a first embodiment of the present invention.

Referring to FIG. 2 herein, there is illustrated schematically an RDF bale 200 bound by a plurality of straps 201, 202, 203, 204 according to a specific embodiment of the present invention. Each strap comprises an elongate band of plastics material. Each strap extends around the bale, and the two ends of the strap are tied together in a knot or twist 205, so that the strap is tied to itself. The example bale shown is tied together with 4 straps, although the number of straps which each bale can be tied with can be varied provided that the total number of straps can withstand at least the outward expanding force of the bale force divided by the number of straps holding the bale.

The novel recyclable thermoplastic baling strap is fitted using a baling machine, a hydraulic press which compresses a bale under a ram force of approximately 120 tonnes. Once compacted, a plurality of individual baling wires/straps are wrapped around the bale. These may be manually fed around the bale or applied by an automated strap feeder. The material of the recyclable thermoplastic strap is flexible enough that it may be wrapped or twisted around itself and formed into a wide range of knots under applied tension. It is anticipated that the knots are tied by the baling machine but the strap may also be manipulated manually e.g. using pliers. The extruded strip is flexible enough that it can be folded back on itself 180° or formed into a 360° radius in the range 5 mm to 8 mm, without cracking.

Once the knot is formed and the compression from the baling machine is removed, due to the pattern of undulations on the outer surface of the strip (see FIGS. 4 and 5) and the self-tying nature of the recyclable strap, which has shape memory once it has been placed under tension in a knot, the strap retains its knot shape. When tied around the bale, the knot remains under tension from the expansive force of the bale.

Figure 3:
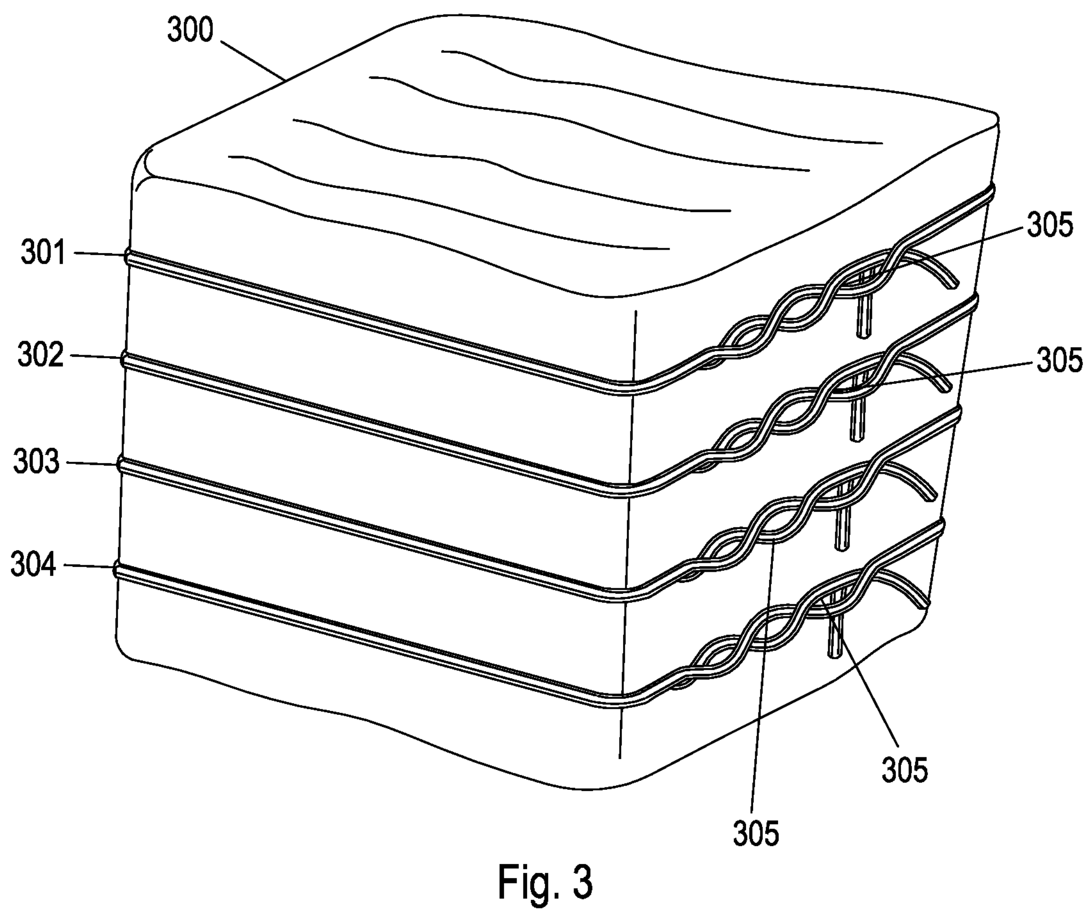
FIG. 3 herein illustrates schematically a bale of plastics refuse material bound by multiple novel recyclable thermoplastic baling strips each according to a second embodiment of the present invention.

A second embodiment of the present invention and a further alternative solution to metal baling straps is illustrated schematically in FIG. 3 which shows an RDF bale 300 bound by four recyclable thermoplastic straps 301, 302, 303, 304, according to a second embodiment of the present invention. Each strap comprises an elongate band of plastics material. Each strap extends around the bale, and the two ends of the strap are tied together in a knot or twist 305, so that the strap is tied to itself. In the example, four individual straps are sufficient to withstand the outward expanding force of the bale.

The novel recyclable thermoplastic baling strap is fitted using a baling machine comprising a hydraulic press which compresses a bale under a ram force of approximately 120 tonnes. Once compacted, a plurality of individual baling wires/straps are wrapped around the bale. These may be manually fed around the bale or applied by an automated strap feeder. The material of the recyclable thermoplastic strap is flexible enough that it may be wrapped or twisted around itself and formed into a wide range of knots under applied tension. It is anticipated that the knots are tied by the baling machine but the strap may also be manipulated manually e.g. using pliers. The extruded strip is flexible enough that it can be folded back on itself 180° or formed into a 360° radius in the range 5 mm to 8 mm, without cracking.

Once the knot is formed, and the compression from the baling machine is removed, due to the self-tying knot and the shape memory of the thermoplastics material, the strip once it has been placed under tension in a knot, the strip retains its knot shape. When tied around the bale, the knot remains under tension from the expansive force of the bale.

Figure 4:
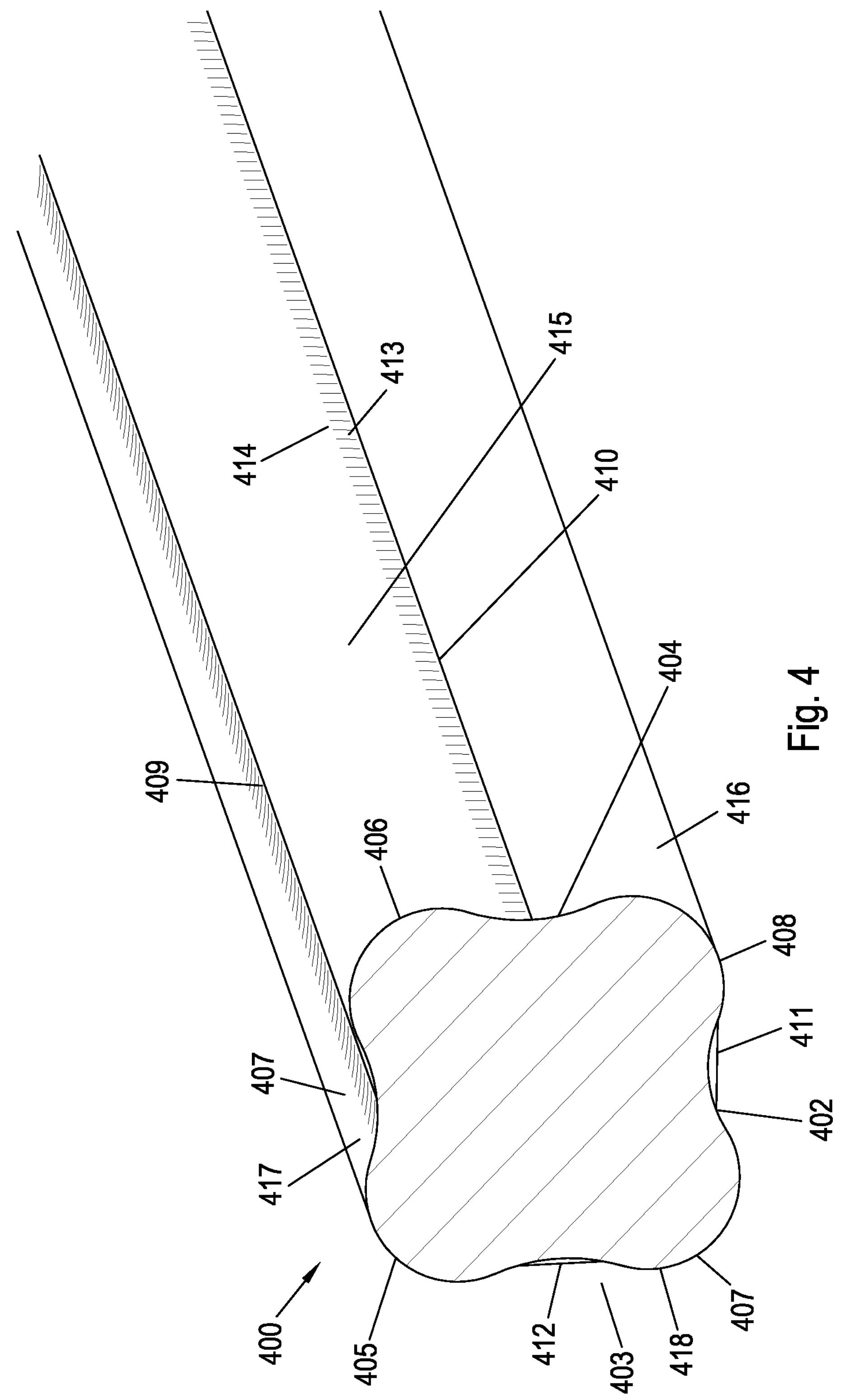
FIG. 4 herein illustrates schematically in perspective cutaway view a length of the novel baling strip according to a first specific embodiment of the present invention.

Referring to FIG. 4 herein, there is illustrated schematically a length of the first embodiment elongate strap of FIG. 2 herein. The strap comprises an elongate body 400 having a substantially four-leaf clover shaped cross-section. The elongate body having upper and lower opposing faces 401, 402; and first and second opposing sides 403, 404 respectively. The upper and lower opposing faces 401, 402 each occupy a respective upper and lower plane, said upper and lower planes being parallel to each other. Said first and second sides 403, 404 each occupy a corresponding respective first and second outer plane, said first and second outer planes being substantially parallel to each other and spaced apart from each other.

The four-leaf clover shaped cross section consists of fourth substantially circular lobes 405, 406, 407 and 408, which each run along a main length of the strap. The external perimeter of the strap being substantially symmetrical. Located between each lobe are four regions of undulations 409, 410, 411 and 412 which each run along the main length of the strap and sit in the lowest valleys 409-412 of the four-leaf clover cross section with the lobes 405-408 being considered the highest regions. When the strap is wound or tied with itself, the undulations are in contact with one another.

Each of the regions of undulations 409-412 comprises a plurality of ridges 413 and valleys 414, said ridges extending transverse to a main length direction of the elongate strap. The regions of undulations are spaced apart by four relatively smooth surfaces 415, 406, 417, 418 which form the outermost parts of lobes 405-408. The first to fourth sets of undulations are arranged around and surrounding the main centre line of the elongate body. The four regions of undulation and four relatively smooth regions are arranged alternately around the body of the strap.

As viewed in a direction perpendicular to the outer surface of the strip, the ridges and alternating valleys of the undulations may each form a substantially straight line extending in a direction normal to the main length axis of the elongate body. However, it will be clear that alternative configurations of undulations will be apparent. Alternatively, as per the second embodiment of FIGS. 3 and 6 the baling wire may be smooth.

Figure 5:
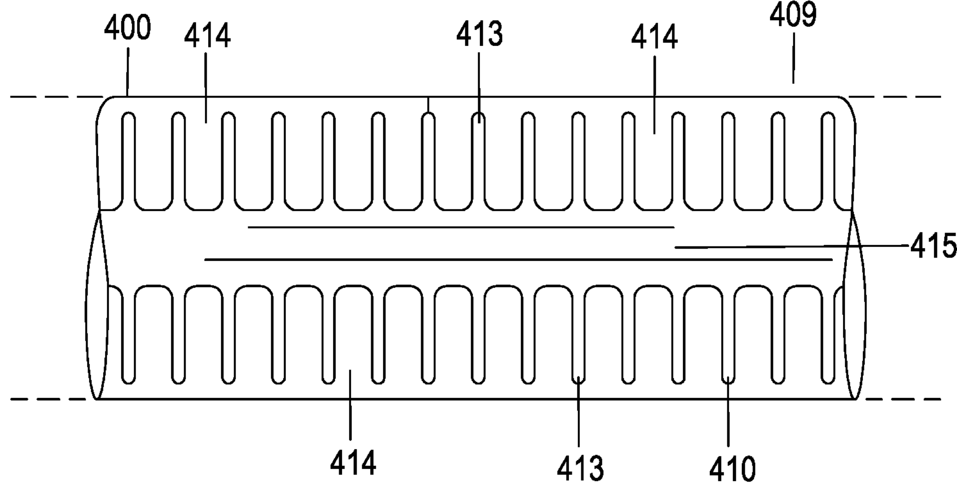
FIG. 5 herein illustrates schematically a view of the length of the first embodiment baling strip of FIG. 4 in cutaway view as viewed along a main length axis of the strip.

Referring to FIG. 5 herein there is shown a length of the elongate strap of FIG. 4, in view from one side, along lobe 406 with smooth surface 415 and regions of undulations 409 and 410 visible. A corresponding view would apply if the strap were viewed from the other side along lobe 407, the strap being symmetrical (or at least substantially symmetrical) about a central plane perpendicular to the upper and lower planes, and bisecting the elongate body, said being symmetrical about another central plane bisecting the first central plane and being parallel to said first and second outer planes. The ridges 413 and valleys 414 of the regions of undulation are visible which extend transverse to the main length direction of the elongate body.

In the best mode embodiment, the elongate strap has dimensions as follows:

Width: 3 mm to 8 mm

- Breadth: 2 mm to 6 mm
- Cross-sectional area in a direction perpendicular to the main length of the strap: 6 $mm^2$ to 48 $mm^2$
- Length of elongate ridges: 25% to 35% of width dimension
- Length of valleys: 25% to 35% of width dimension
- Height of ridges above valleys 0.2 mm to 1 mm
- Number of ridges per unit length: 8 to 12 per cm
- Undulations per millimetre of strip length: 0.83 to 1.25 per set It will be apparent to one skilled in the art that the undulations may in the alternative be present on the lobes 405-408 rather than in the lowest valleys 409-412 of the four-leaf clover cross section. Several geometries for the positioning of series of undulations along the length of the strip are possible, for example, undulations may be formed in a helical pattern, in either an anticlockwise or clockwise twist along a length of the strap. Similarly, it will be obvious to one skilled in the art that the cross-section of the strap can be altered by changing the extrusion die.

Figure 6:
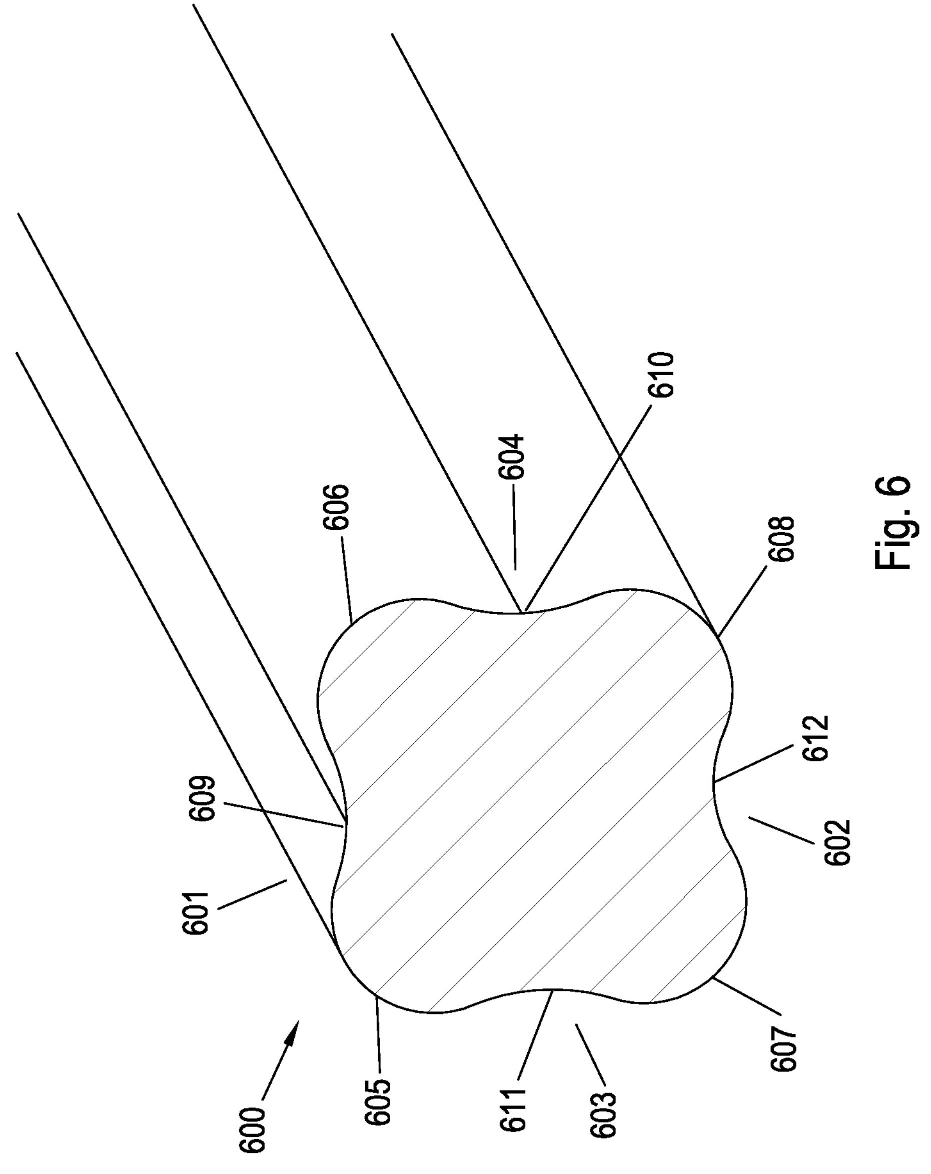
FIG. 6 herein illustrates schematically in cross-sectional view a length of novel baling strip according to the second specific embodiment of the present invention.

Referring to FIG. 6 herein, there is illustrated schematically a length of the elongate strap of FIG. 3 in accordance with a second embodiment of the present invention. The strap comprises an elongate body 600 having a substantially four-leaf clover shaped cross-section. The elongate body having upper and lower opposing faces 601, 602; and first and second opposing sides 603, 604 respectively. The upper and lower opposing faces 601, 602 each occupy a respective upper and lower plane, said upper and lower planes being parallel to each other. Said first and second sides 603, 604 each occupy a corresponding respective first and second outer plane, said first and second outer planes being substantially parallel to each other and spaced apart from each other.

The four-leaf clover shaped cross section consists of fourth substantially circular lobes 605, 606, 607 and 608, which each run along the main length of the strap. The external perimeter of the strap being substantially symmetrical and smooth. Located between each lobe 605-608 are four lower regions, valleys or minor indentations 609, 610, 611 and 612 of the four-leaf clover cross section with the lobes 605-608 being considered the highest regions. When the strap is wound or tied with itself, the lowest regions and indentations are in contact with one another and about one another to self-lock the strap.

Figure 7:
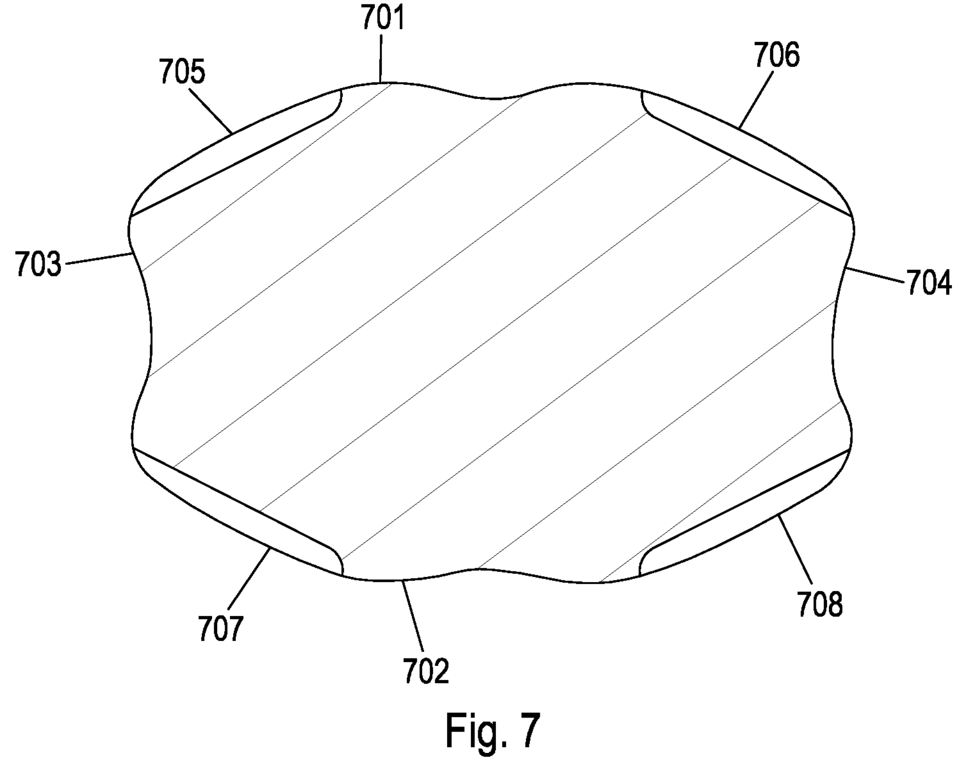
FIG. 7 herein illustrates schematically in cut away view along a main axial length, a novel third baling strip according to a third specific embodiment of the present invention.

Referring to FIG. 7 herein, there is shown schematically a length of elongate strap shown in cutaway view as viewed along a main length direction of the elongate strap in accordance with a third embodiment of the invention. The elongate strap 700 comprises upper and lower relatively smooth surfaces 701, 702 located diametrically opposed to one another and first and second relatively smooth side surfaces 703, 704 also located substantially opposite one another and substantially transverse to the upper and lower surfaces. The third embodiment has four regions of undulations 705, 706, 707, 708 which each extend along a main length of the elongate strap and each comprise ribs or undulations to provide an area of enhanced grip.

Figure 8:
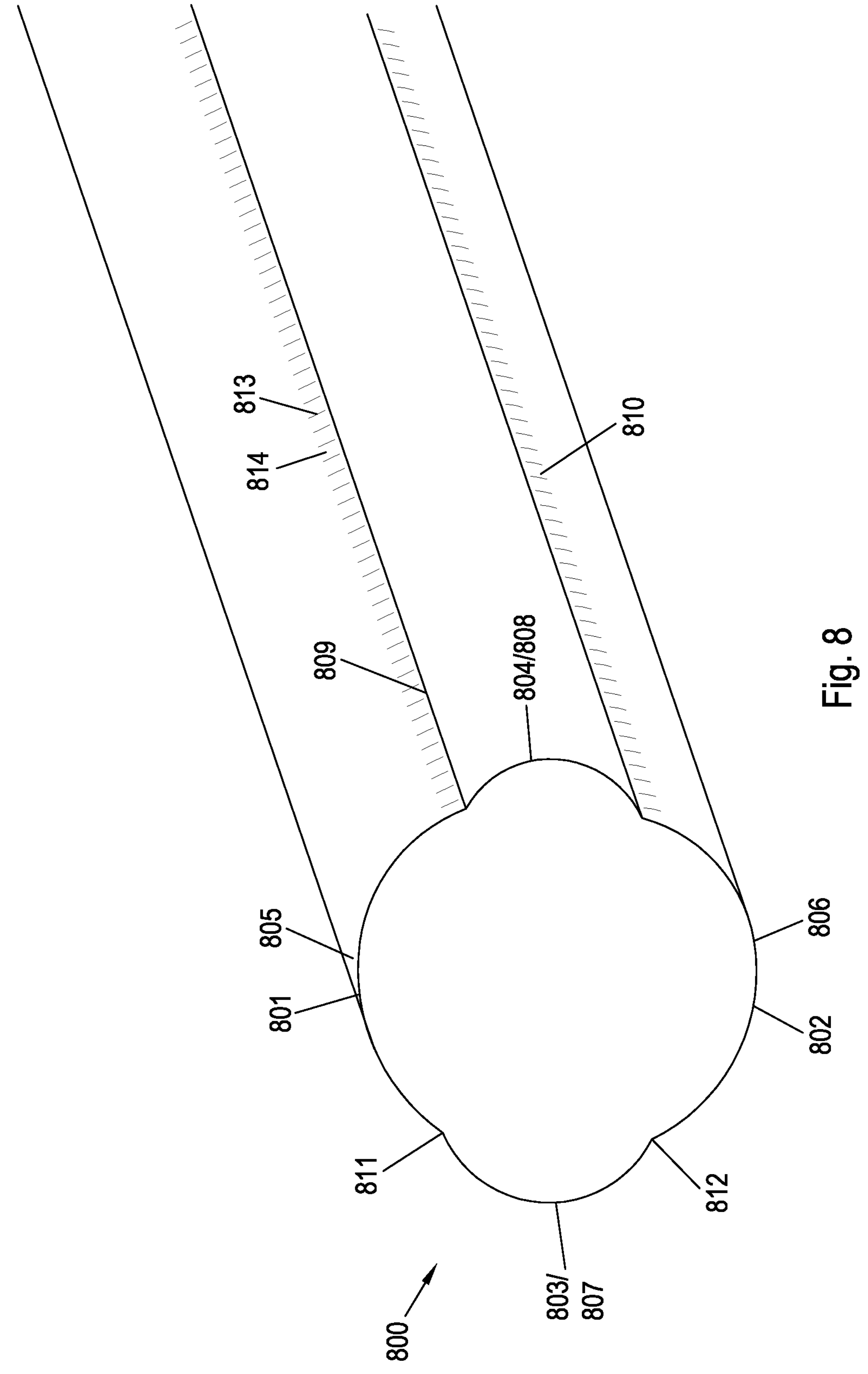
FIG. 8 herein illustrates schematically in perspective cutaway view a length of a fourth novel baling strip according to a fourth specific embodiment of the present invention.

Referring to FIG. 8 herein, there is shown schematically a length of elongate strap shown in cutaway view as viewed along a main length direction of the elongate strap in accordance with a fourth embodiment of the invention. The elongate strap 800 having a substantially circular cross-section comprises upper and lower opposing faces 801, 802; and first and second opposing sides 803, 804 respectively. The upper and lower opposing faces 801, 802 each occupy a respective upper and lower plane, said upper and lower planes being parallel to each other. Said first and second sides 803, 804 each occupy a corresponding respective first and second outer plane, said first and second outer planes being substantially parallel to each other and spaced apart from each other.

The substantially circular cross-section consists of first and second 805, 806 larger smooth arc portions and two smaller arced portions 807, 808 located transverse to the larger arcs and substantially opposite one another. The external perimeter of the strap being substantially symmetrical. Located between each larger and smaller arc portion are four regions of undulations 809, 810, 811, 812 which each run along the main length of the strap and sit in narrowest width and breadth of the cross-section. When the strap is wound or tied with itself, the undulations are in contact with one another.

Each of the regions of undulations 809-812 comprises a plurality of ridges 813 and valleys 814, said ridges extending transverse to a main length direction of the elongate strap. The first to fourth sets of undulations are arranged around and surrounding the main centre line of the elongate body. As viewed in a direction perpendicular to the outer surface of the strip, the ridges and alternating valleys of the undulations may each form a substantially straight line extending in a direction normal to the main length axis of the elongate body. However, it will be clear that alternative configurations of undulations will be apparent. Alternatively, the baling wire share the same cross-section but may be absent of undulation and may be smooth.

For all embodiments described herein, novelty lies in the baling strap having a unique composition of recyclable thermoplastics material. For all embodiments described herein, the elongate body is extruded from a novel polymer designed for high strength and durability which is based on recycled polyethylene terephthalate (rPET). During the processing of PET, degradation of intrinsic viscosity (IV) can occur, this degradation can lead to negative effects on the physical and mechanical properties of the baling strap thus limiting its potential for re-use. It is also a known limitation that PET is intrinsically hygroscopic and absorbs moisture from the atmosphere which can lead to further weakening of the product's mechanical properties and environmental stress cracking. Such moisture also requires removal during drying out before the extrusion process.

The recyclable thermoplastic material disclosed herein (ePET') is an ethylene polyethylene terephthalate (ePET) derivative which enhances the properties of known rPET. ePET is a proprietary compound of recycled PET; ePET comprises rPET with an additional 6%±2% by weight of polyethylene, preferably 7% polyethylene [ePET=rPET+polyethylene]. The addition of polyethylene protects the product against hygroscopic attack, affording a strong impermeability to moisture. This allows rPET to undergo a transformation of the intrinsic viscosity without the inherent problems caused by moisture.

The novel ePET' composition comprises ePET and a specially formulated masterbatch (MB) [ePET'=ePET+MB]. A schematic flow chart of the chemical process for creating each of the novel MB and the novel ePET' are as shown in FIG. 9.

Figure 9:
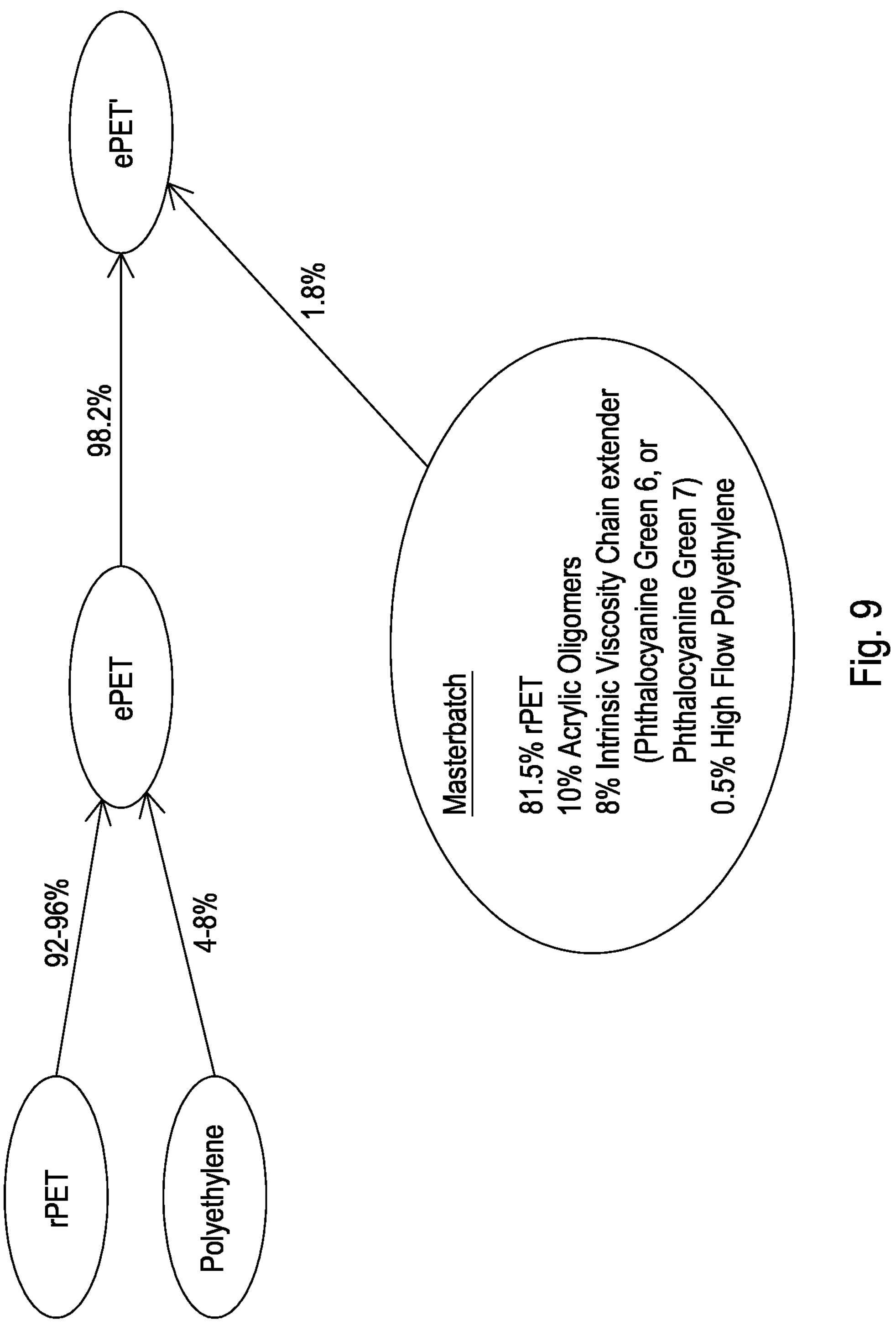
FIG. 9 herein shows a schematic illustration of the novel processes for creating ePET, the masterbatch MB and ePET'.

Referring to FIG. 9 herein, the chemical process for enhancement of the intrinsic viscosity and further strengthening of the rPET is illustrated. FIG. 9 illustrates one pathway formulation of the finished ePET' material, and it will be appreciated that the proportions of the constituent components can be varied in the ranges as described in the examples presented herein.

In one process, previously unused amorphous polyethylene terephthalate (aPET) may be used as the bulk constituent of the ePET and/or as a constituent of the masterbatch. Amorphous unused PET has more durable strength and/or superior ductility qualities compared to recycled PET (rPET). rPET can be uplifted to give it the same or near same properties as aPET. rPET is in effect aPET which has already been through one or more use-recycle cycles, and is no longer virgin unused aPET. During those use-recycling loops, the properties of the aPET degrade to the properties of recycled rPET. However, use of rPET for baling wires or straps is more environmentally sustainable than use of new or previously unused aPET.

The formulation of the masterbatch acts to improve the qualities of the combined (aPET) or (rPET) and polyethylene mix (ePET) as the bulk constituent, to give it acceptable properties for use as a baling strap, wire or strip, without the use of carbon black, so that the resulting baling strap or wire is itself recyclable, meaning that the resulting baling wire, strap or strip can be used to bale waste which is destined for recycling, as well as for waste which is destined for incineration.

In the following examples a process using recycled PET (rPET) as a bulk constituent of the (ePET) is described. Using (aPET) as a bulk feed material instead of (rPET) would also provide a suitable baling wire, with equally good if not better mechanical properties than rPET based baling wire, but is less environmentally advantageous than using rPET as the bulk constituent of the ePET. The two processes follow the same overall process stages except where stated to be specific to one process or the other.

In a preferred process, recycled PET (rPET) is used as a bulk constituent of the ePET.

Modified rPET Masterbatch

A masterbatch of modified rPET is created which contains unmodified rPET, one or more multifunctional acrylic oligomers selected from the set of: set hydroxylpropyl methacrylate, 2-hyrdoxylpropyl methacrylate, benzoylated hydroxylpropyl methacrylate; IV chain extenders, which preferably utilise acrylic oligomer technology and are based on benzoylated hydroxymethyl acrylate at 8% addition; and high flow polyethylene.

The acrylic oligomers raise the intrinsic viscosity of the rPET to levels akin to the intrinsic viscosity of amorphous PET (aPET) being a prime unused PET (alternatively referred to as the virgin version of the polymer, which is unused and has not been recycled).

The masterbatch materials are blended together, melted, mixed and extruded to make the masterbatch product: rPET+(acrylic oligomers+Phthalocyanine Green C32CI16CUN8+polyethylene wax).

Preferably the masterbatch of modified rPET is controlled to solidify at a temperature of between 220° C. and 260° C. Dependent on external conditions, at ambient temperature full transition to solid-state should be achieved between 20 and 35 seconds.

The masterbatch of modified rPET is added to the ePET preferably in the proportions 97-99% rPET to 1%-3% modified rPET masterbatch, and preferably in the proportions 98.2% ePET to 1.8% modified rPET masterbatch to result in an ePET', being the final material used to extrude the baling wire.

Alternative aPET Masterbatch

In an alternative masterbatch formulation, instead of using recycled polyethylene terephthalate rPET, the main constituent may comprise amorphous polyethylene terephthalate aPET. aPET is prime previously unused polyethylene terephthalate, (also called virgin PET). The alternative masterbatch formulation comprises 81.5% aPET, 8% phthalocyanine green, 10% acrylic oligomers; and 0.5% high flow polyethylene. Preferably the multi-functional acrylic oligomers are selected from the set: hydroxylpropyl methacrylate; 2-hydroxylpropyl methacrylate; benzoylated hydroxylpropyl methacrylate.

Preparation of ePET

The bulk ePET is prepared by adding 6%±2% by weight polyethylene to 92-96% of rPET to obtain ePET. The rPET is combined with a strong phthalocyanine based nucleating agent, for example Phthalocyanine Green G or Phthalocyanine Green 7 which increases the crystallinity of the polymer and speeds up the transition from molten to solid state. The primary purpose of the Phthalocyanine Green is for its nucleating agent properties. It also lends green coloration to the final ePET, but its use as a nucleating agent is its primary reason for inclusion, rather than its coloration properties. 6%±2% by weight, preferably 7% polyethylene is added to the rPET. The resulting novel ePET product is denser, strengthening chains within the recycled thermoplastic end product e.g. the baling strap.

Preparation of Modified ePET'

The final ePET' which is the final material from which the baling wire is made is formed from 97%-99% ePET and 1%-3% masterbatch of modified rPET. Preferably the proportions are 98.2% ePET and 1.8% masterbatch of modified rPET.

Example 1

In example 1, a novel ePET' was prepared from a 99.2% ePET and 0.8% by weight of green masterbatch (GN MB). The temperature of extrusion was above 220-260° C. and the cooling wind temperature was 220-260° C., and the winding speed or extrusion rate was 50 m/min.

Figure 10:
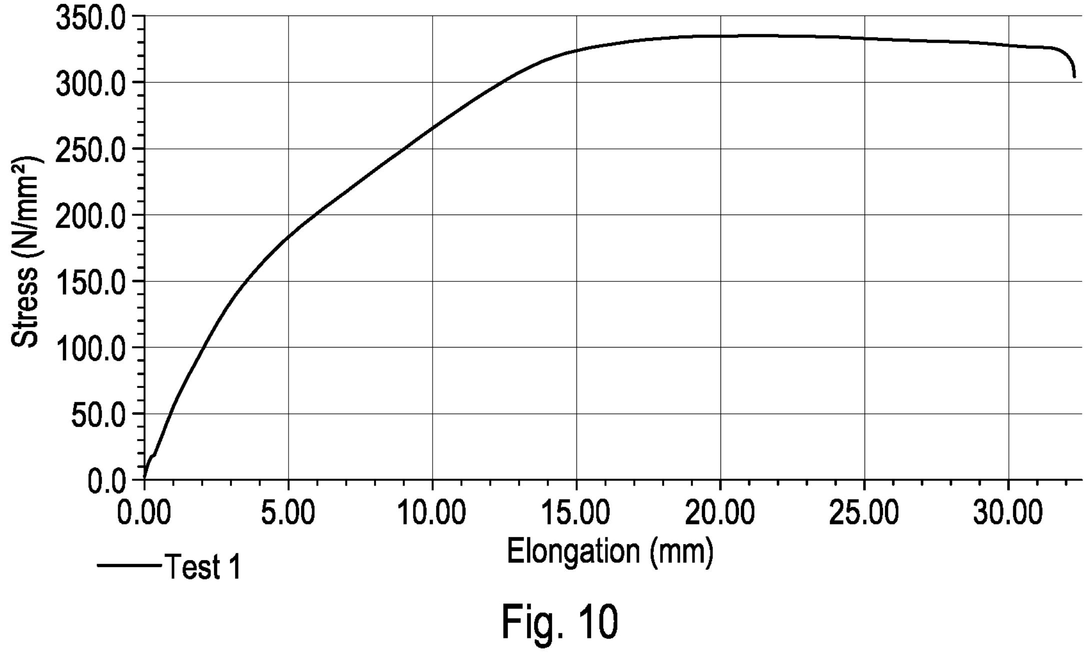
FIG. 10 herein shows the tensile or breaking strength of a first exemplary ethylene polyethylene terephthalate composition.

Referring to FIG. 10 herein, the tensile or breaking strength of 100.00 mm length of a 4.0 mm diameter extruded baling wire of example 2 was measured as Newtons per Millimetre squared (N/mm$^2$). The sample was loaded with a pretension of 50.000N and the test speed was 12.500 mm/min. As per FIG. 10, the maximum force at peak during the stress test was 4179.000N, the stress at peak was 332.316 N/mm$^2$ and the strain at break was 32.275%.

Example 2

In example 2, a novel ePET' was prepared from a 98.6% ePET and 1.4% by weight of green masterbatch (GN MB). The temperature of extrusion was above 220-260° C., the cooling wind temperature was 220-260° C., the winding speed or extrusion rate was 50 m/min.

Figure 11:
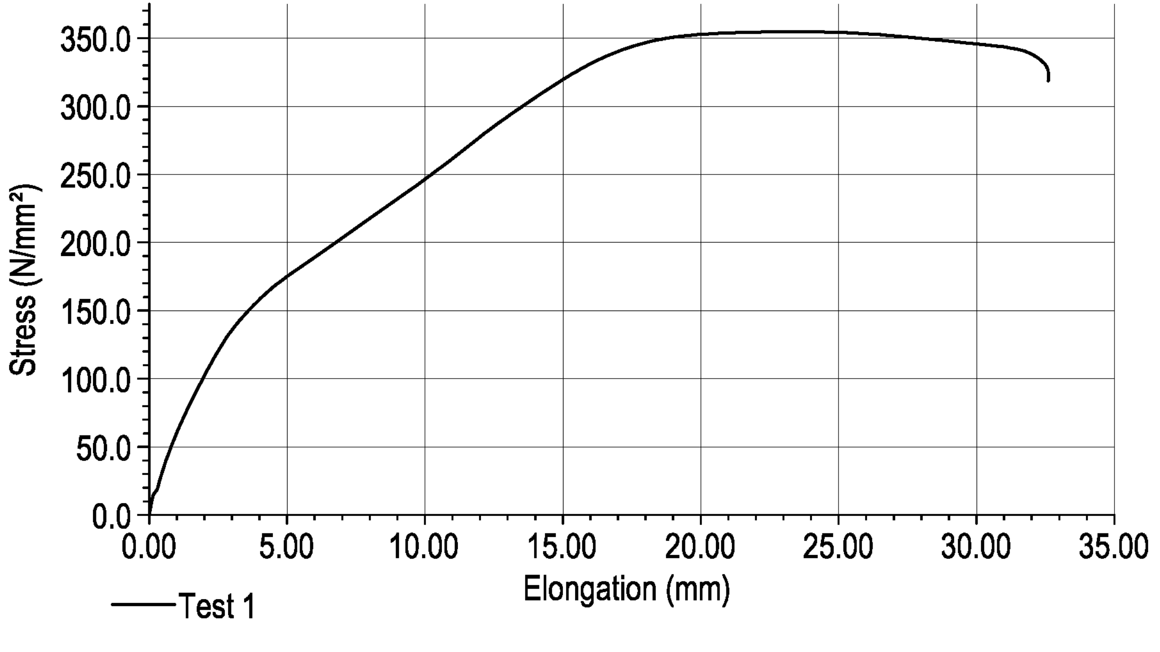
FIG. 11 herein shows a plot of stress against elongation of a second exemplary ethylene polyethylene terephthalate composition.

Referring to FIG. 11 herein, the tensile or breaking strength of 100.00 mm length of a 4.0 mm diameter extruded baling wire of example 3 was measured as Newtons per Millimetre squared (N/mm$^2$). The sample was loaded with a pretension of 50.000N and the test speed was 12.500 mm/min. As per FIG. 11, the maximum force at peak during the stress test was 4445.000N, the stress at peak was 353.722 N/mm$^2$ and the strain at break was 32.518%.

Example 3

In a third example, a novel ePET' was prepared from a 99% ePET and 1.1% by weight of a green coloured masterbatch (GN MB). The temperature of extrusion was above 220-260° C., the cooling wind temperature was 220-260° C., the winding speed or extrusion rate was 50 m/min.

Figure 12:
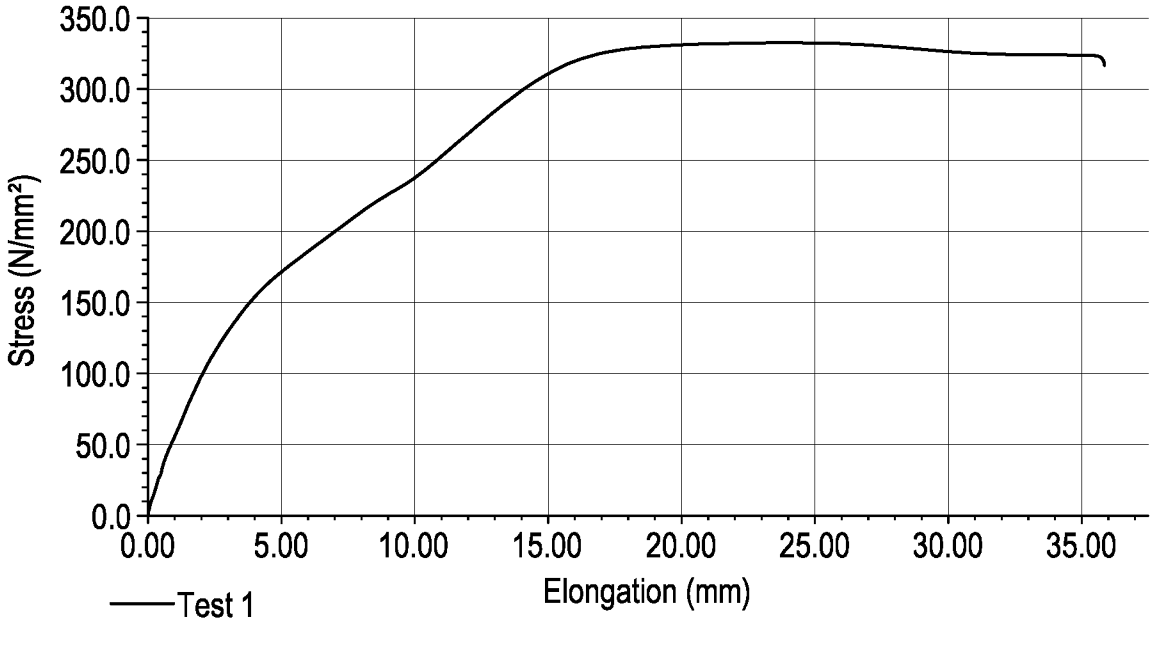
FIG. 12 herein shows a plot of stress against elongation of a third exemplary ethylene polyethylene terephthalate composition.

Referring to FIG. 12 herein, the tensile or breaking strength of a 100.00 mm length of a 4.0 mm diameter extruded baling wire of example 1 was measured as Newtons per Millimetre squared (N/mm$^2$). The sample was loaded with a pretension of 50.000N and the test speed was 12.500 mm/min. As per FIG. 9, the maximum force at peak during the stress test was 4169.000N, the stress at peak was 331.758 N/mm$^2$ and the strain at break was 35.774%.

Example 4

In example 4, a novel ePET' was prepared from a 98.6% ePET and 1.4% by weight of a green-coloured masterbatch (GN MB). The temperature of extrusion was above 220-260° C., the cooling wind temperature was 220-260° C., the winding speed or extrusion rate was 50 m/min.

Figure 13:
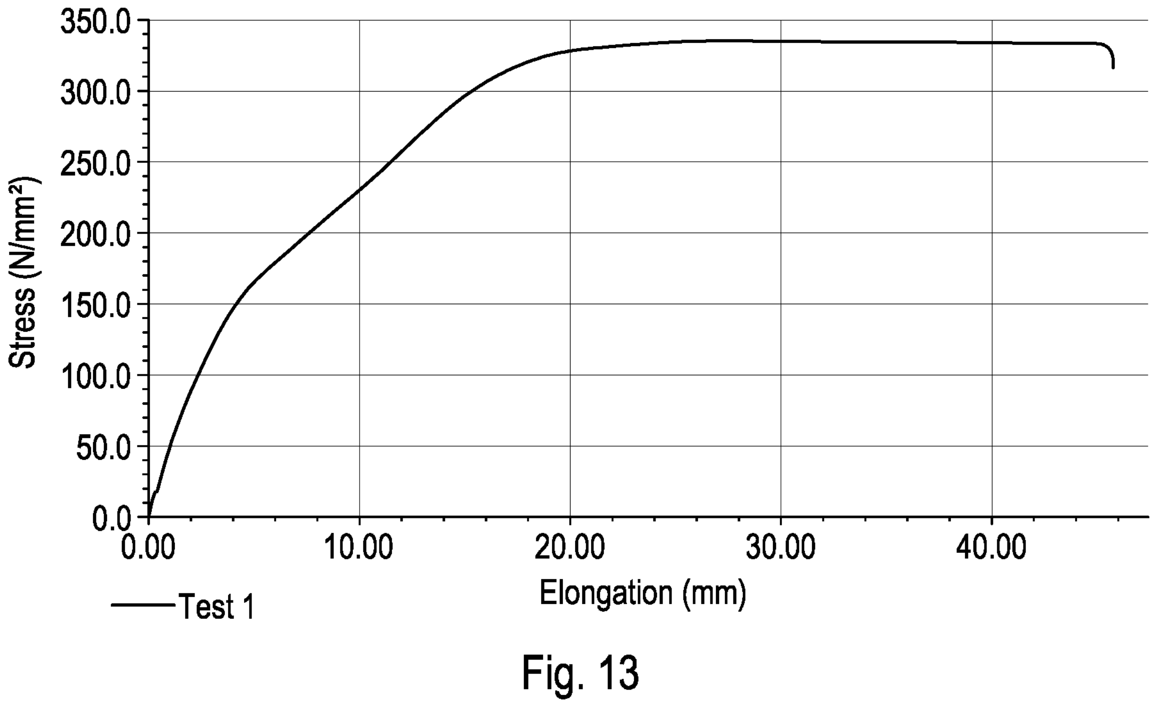
FIG. 13 herein shows a plot of stress against elongation of a fourth exemplary ethylene polyethylene terephthalate composition.

Referring to FIG. 13 herein, the tensile or breaking strength of 100.00 mm length of a 4.0 mm diameter extruded baling wire of example 4 was measured as Newtons per Millimetre squared (N/mm$^2$). The sample was loaded with a pretension of 50.000N and the test speed was 12.500 mm/min. As per FIG. 12, the maximum force at peak during the stress test was 4213.000N, the stress at peak was 335.260 N/mm$^2$ and the strain at break was 45.737%. In example 5, a further novel ePET' was prepared from 98.2% ePET and 1.8% by weight of a green coloured masterbatch.

In the above examples, the green-coloured masterbatch (GN MB) comprises:

(% by weight):

81.5% polyethylene terephthalate

10% Phthalocyanine Green (C32CI16CuN8)

8% Intrinsic viscosity IV chain extender, which utilises acrylic oligomer technology and is based on benzoylated hydroxyethyl methacrylate 0.5% high flow polyethylene (Polyethylene wax)

wherein the polyethylene terephthalate is preferably recycled polyethylene terephthalate rPET; and the Phthalocyanine Green is either Phthalocyanine Green G or Phthalocyanine Green 7 which functions as a nucleating agent.

Preferably the pigment colour is Phlalocyanine Green (C32CI16CuN8) having a RAL of 6004 such that the final baling strap has a RAL of 6016 or a colour in in the range Pantone 332 to Pantone 329U green, and suitably in the range Pantone 2420 to 2426 U or blue/green Pantone 324U to 329U may be used. It will be readily understood that alternative coloured dye additives may be used.

The flexibility of the elongate body can be varied by varying the tension of extrusion of the ePET' through a die of an extrusion machine during manufacture. Preferably, the extrusion tension is set in the range 90 and 110 lbf/in$^2$.

Figure 14:
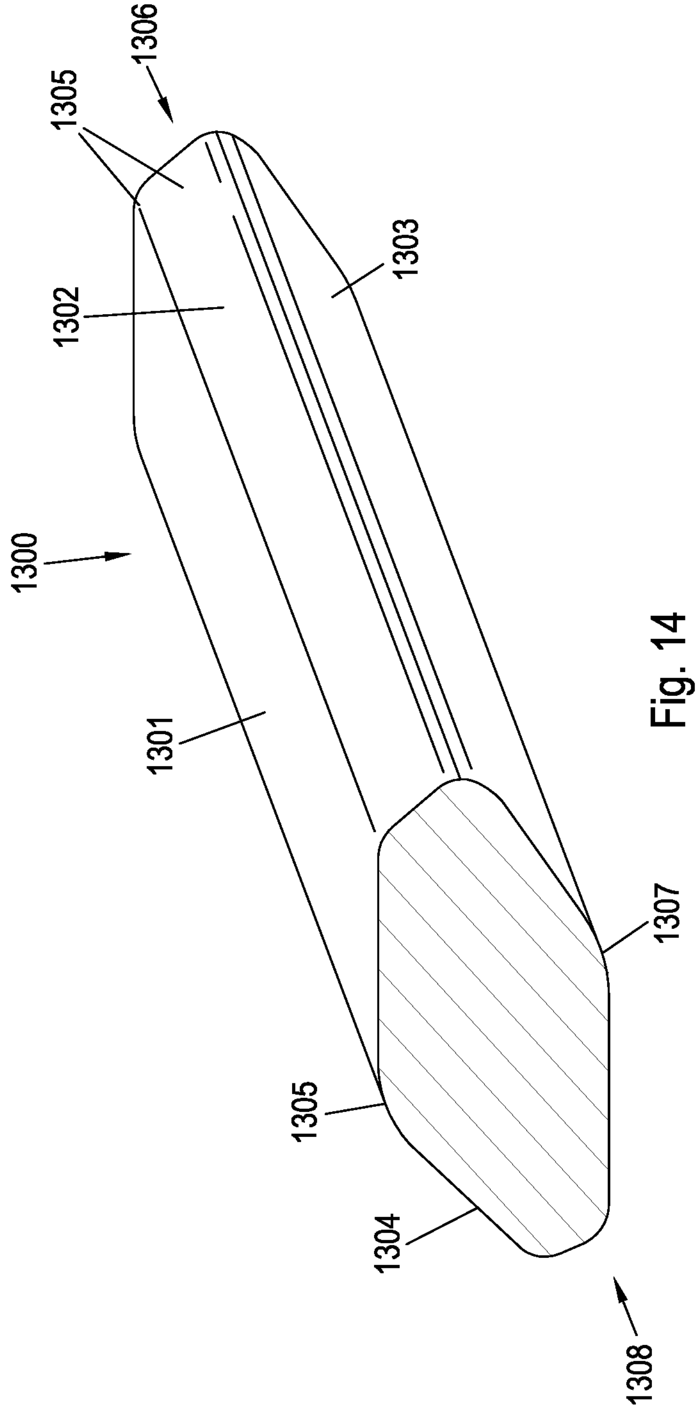
FIG. 14 herein shows in perspective view an example of a fifth baling wire according to a fifth specific embodiment, having a smooth outer surface.

Referring to FIG. 14 herein, there is illustrated a fifth specific embodiment baling wire which is manufactured as described herein but with the following shape and surface variations. Instead of being formed with a plurality of undulations extending along the length of the baling wire, the baling wire is formed with a substantially smooth outer surface along the whole of its length.

In the example embodiment shown in FIG. 14, the shape of the baling wire as viewed in a direction along a main length of the baling wire lies within the four sides of a quadrilateral, such that each of four main sides 1301-1304 lies along the sides of said quadrilateral, and the corners of the cross-sectional profile adjacently corners of the quadrilateral are rounded with a radius of curvature which is in the range 5% to 20% of the maximum width dimension across the cross sectional profile. The rounded corners 1305-1308 of the cross-sectional profile, which extend as rounded edges along the length of the baling wire between the nominally substantially flat planar faces of the baling wire need not be segments of a perfect circle, although in some instances they could be, but rather form curved surfaces linking adjacent sides of the profile, corresponding to adjacent nominally flat faces 1301-1305 of the baling wire.

Figure 15:
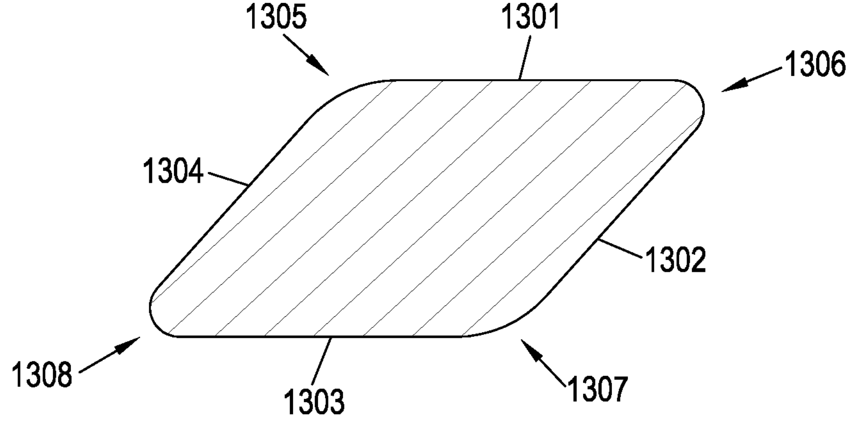
FIG. 15 herein shows the fifth baling wire in cut away view as viewed along a main axial direction of the fifth baling wire.

Referring to FIG. 15 herein, there is illustrated schematically the cross-sectional profile of the smooth surfaced baling wire of FIG. 14 herein.

In the general case, the embodiments may be provided with undulations spaced periodically along the main length of the bailing wire, to improve self-gripping and knotting off the baling wire with itself, and in other embodiments, the baling wire may have a substantially smooth outer surface such that the cross-sectional profile of the baling wire does not vary along its length.

Where undulations are provided, several geometries for positioning of series of undulations along the length of the strip are possible. In further embodiments, sets of ridges and valleys may be formed in a helical pattern on the outer surface of a main solid elongate body, in either an anti-clockwise or clockwise twist along a length of the strap. In the general case, the basic primary shape of the main body of the strap may be circular, square, rectangular, elliptical, or clover leaf shaped. The number of separate sets of undulations separated from each other around a main perimeter of the elongate strip may range from 2 to 8 sets. The sets may be spaced angularly either regularly/equidistantly around the perimeter of the elongate strip or may be positioned irregularly/non-symmetrically around the perimeter of the strip when viewed in a direction along a main length axis of the elongate body.

Figure 16:
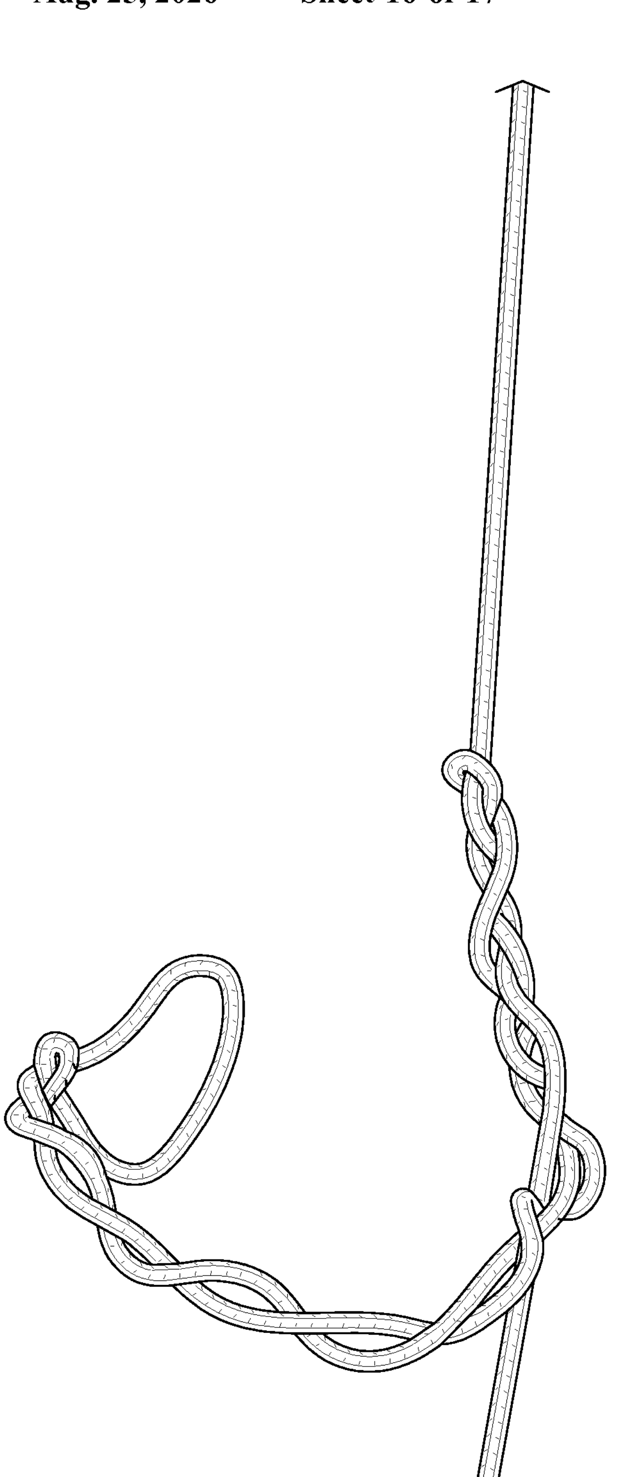
FIG. 16 herein shows a representative strip of baling wire self-tied into a knot.

FIG. 16 herein shows an exemplary length of the first embodiment of the present invention, but which could be any of the aforementioned embodiments having outer undulations, tied into a knot. The material of the strip is flexible enough that it can be folded back on itself 180°, or formed into a 360° having radius in the range 5 mm to 8 mm. The undulations on a first region of the strap abut adjacent undulations on a second region of the strap to self-lock the twisted strap against itself. When tied around the bale, the knot remains under tension from the expansive force of the bale.

In alternative embodiments, where the strap is smooth and absent of undulations, when the knot is formed under tension, a first region of the strap abuts a second region of the same strap and frictional forced within the knot or any regions of uneven surface e.g. a groove or divot on the surface of the elongate strap may bite into an adjacent surface of another section of the strap, causing the strap to be locked tightly in the knot.

In yet further embodiments intended for use without being twisted into a knot, the baling strip may comprise a flat strip or strap having substantially rectangular cross section as viewed in a direction along a main length of the extended bailing strip, as a flat baling strip. The substantially flat baling strip may have upper and lower surfaces which are indented or impressed with a pattern, for example an extended repeating square tiled pattern. The flat baling strap may be manufactured from ePET or ePET'. In use, the flat baling strap may be fastened around the bale by a steel clamp, a friction weld or a soft metal clip. Typically, the cross-sectional dimensions of the flat strap as viewed in a direction along the main length of the strap may be in the range:

Height (thickness)—0.65 mm to 3 mm and preferably 1 mm to 1.5 mm;

Width—8 mm to 25 mm and preferably in the range 10 mm to 20 mm, with examples: (1) thickness 0.65 mm, width 12.5 mm+−10%; and (2)

thickness 1.2 mm, width 18 mm+−10%. The flat strap embodiment comprises has a thermoplastic polymer comprising polyethylene terephthalate (PET) and 6%±2% by weight of polyethylene. The flat thermoplastic baling strap made from the above materials may have mechanical properties which allow it to be cold-friction welded to itself under sufficient tension and compression.

In the best mode embodiments, preferably the elongate band has the following physical characteristics:

Material: thermoplastic, recycled polyethylene terephthalate rPET.

4-8%, preferably 7% by mass, of polyethylene;

Ultimate tensile strength: 300.000 $N/mm^2$ to 400 $N/mm^2$

Figure 17:
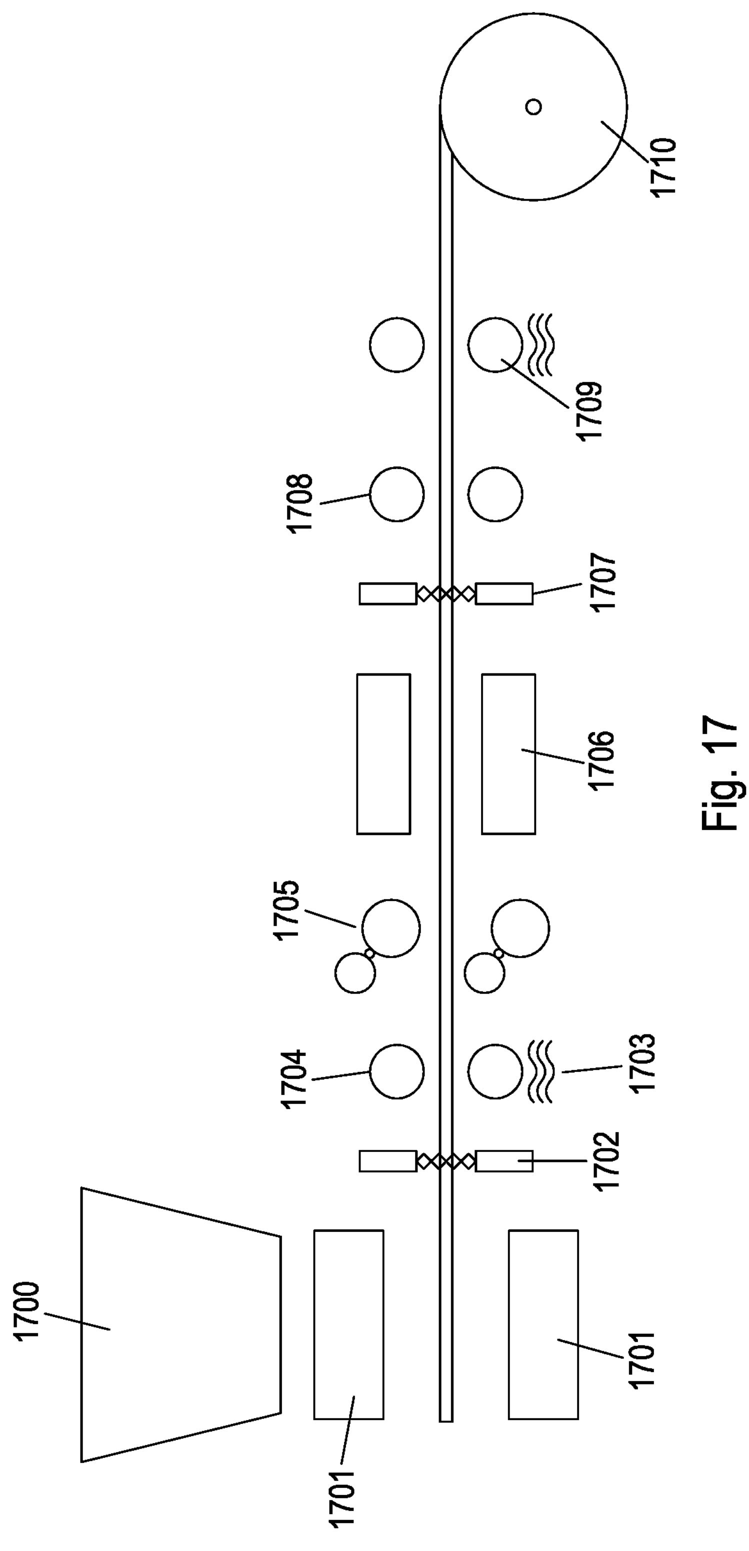
FIG. 17 herein shows in schematic view and apparatus for manufacture of a novel baling strip as disclosed herein.

Referring to FIG. 17, there is illustrated schematically an apparatus suitable for the manufacture of the novel baling strap disclosed herein. As is known in art, the extrusion apparatus may be computer controlled. Prior to use, ePET pellets are dried in a drier to remove moisture and to soften. The softened pellets are then fed into the apparatus.

The apparatus comprises a hopper 1700 for receiving pellets of ePET which are fed into a heating chamber 1700. The heating chamber comprises 5 individual zones, each having its own localized heater to allow the ePET to be heated sequentially at a temperature of approximately 285-305° C. Once molten, the ePET is extruded through a first die 1702 to form a baling strap. The baling strap is then guided through a quenching water bath having an approximate temperature of 80° C. by a plurality of guide rollers 1704. Upon exiting the quenching water bath, the baling strap is passed through a second plurality of guide rollers 1705 which may be either driven or non-driven, which feed the thermoplastic cable into a second heating chamber 1706, comprising three separate stretching ovens having temperatures in the region of 280° C., 270° C. and 250° C. respectively, where the thermoplastic cable is pulled under a tension of 320-400 N/mm to an approximate thickness of 3-5 mm, preferably 4 mm. The thermoplastic baling strap is then passed through a second die 1707, the second die having an aperture shape formed to match the general cross-sectional shape of the baling strip including but not limited to the examples shown herein. Varying the shape of the extrusion die may alter the overall shape of the extruded baling strap. The thermoplastic baling strap may then be passed through a further optional set of impression rollers 1708 to imprint or impress regions of undulations, valleys, or troughs on to the extruded elongate strip as it is progressed out of the die, for embodiment baling wires which have undulations impressed on their outer surface. The pattern of the undulations on the extruded strip correlates with the undulations formed on the impression rollers 1806 which apply indentations to the heated extruded strip. A first set of impression rollers having a first undulation pattern may be swapped for other sets of impression rollers, in order to vary the undulation pattern applied to the external surface of the extruded strip. Finally, the baling strap is guided by a further set of rollers 1709 through a cooling water bath at approximately 20° C. before being wound on to a storage reel 1704. The extruded strip may be cut into predetermined lengths to form individual straps by a baling machine at the time of producing bales. The ends of the individual straps may be tied into knots at the time of baling, by a mechanism on the baling machine.

For embodiments of the baling wire which do not have undulations impressed on the outer surface, the profile of the sets of rollers used to form the cross-sectional shape of the baling wire is smooth and does not have any.

Further, the disclosed teaching includes an elongate baling strip having any cross-sectional shape disclosed herein in combination with any shape of undulation as disclosed herein formed from a novel ethylene polyethylene terephthalate composition. The resulting novel, carbon-free baling wire may be manufactured by extruding a length of thermoplastic material from a suitably shaped die head and passing the elongate extrusion through a set of opposing rollers to impress on the surface of the extrusion the sets of undulations as described herein. Twisting of the strip under tension as the strip is formed through the extrusion die and as it passes through the opposing sets of rollers impressed with the undulation pattern, may be applied in order to provide helically extending lines of undulations along the length of the baling strip.

In a best mode embodiment, the ethylene polyethylene terephthalate, is coloured using a green dye which can be easily identified by automated pickers. This is advantageous as it allows the baling strap to be fully recycled, for example during the processing of plastic bottles, the strap can be continued into the waste sorting plant and does not require prior removal. The baling strap may then be readily identified due to its green colouring and removed for further recycling. However, it will be readily understood that the thermoplastic material can be colourless or can be coloured by addition of coloured additives in a range of different colours to give a range of colours.

The novel straps disclosed herein are also suitable for binding bales of other types of waste material, for example solid recovered fuel (SRF), municipal solid waste (MSW), old corrugated containers (OCC), plastics, polyethylene terephthalate (PET), high-density polyethylene (HDPE), shredded paper, aluminium cans, steel cans, and other recoverable materials.

A summary of the advantages provided by the novel thermoplastic baling strap of the present embodiments described herein include but are not limited to:

The strap may be used to bale waste for both waste processing or recycling. Pre-packed RDF bales can be prepared which have a standardised weight and size prior to deciding the fate of the bale. Pre-packing the bales ensure that the moisture content of the bale is stable.

Because the bales do not require steel or wire strap removal prior to incineration and loose waste is not fed into the incinerators, the burn rate of incinerators can be better controlled by automating control equipment which feeds the bales into an incinerator at a controlled rate. There is also one less labour requirement to remove the straps prior to incineration.

The baling straps are fully recyclable because they do not contain carbon. Therefore, they can be used for processed waste or incinerated waste.

The improved, recyclable, thermoplastic baling strap provides an alternative solution to the previous thermoplastic baling straps offering greater stability at low temperatures and advantageously is fully recyclable. This is due to the presence of 4-8% polyethylene by weight, which increases the glass-liquid transition of the thermoplastics, so the extruded end-product is more stable at lower temperatures.

The invention claimed is:

1. A thermoplastic baling strap, capable of being fastened by a baling machine, said thermoplastic baling strap having a thermoplastic polymer composition comprising 98-99% by weight of a thermoplastic composition including polyethylene terephthalate (PET) and 6%±2% by weight of polyethylene; and 1 to 2% by weight of a masterbatch composition;

said masterbatch composition comprising:

polyethylene terephthalate;

one or more multifunctional acrylic oligomers;

at least one Phthalocyanine-based nucleating agent; and high flow polyethylene.

2. A thermoplastic baling strap, according to claim 1, wherein said thermoplastic baling strap is fastened by a self-tying knot mechanism on a baling machine.

3. A thermoplastic baling strap, according to claim 1, wherein said thermoplastic baling strap comprises a single length of flexible elongate thermoplastic material.

4. A thermoplastic baling strap, according to claim 1, capable of being formed into a knot by twisting said baling strap.

5. A thermoplastic baling strap according to claim 1, wherein said single length of elongate thermoplastic material has an outer surface formed with a plurality of externally facing surface undulations extending along said length of flexible elongate thermoplastic material;

said plurality of surface undulations providing said length of flexible elongate thermoplastic material with a gripping surface; and said plurality of externally facing surface undulations extending along said length of flexible elongate thermoplastic material prevent adjacent parts of the band within the knot from slipping with respect to each other when said baling strap is formed into a knot.

6. A thermoplastic baling strap according to claim 5, comprising:

a first set of surface undulations extending along a first surface of said length of flexible elongate thermoplastic material;

a second set of surface undulations extending along a second surface of said length of flexible elongate thermoplastic material;

wherein said first and second surfaces are on opposite sides of said length of flexible elongate thermoplastic material.

7. A thermoplastic baling strap according to claim 5, wherein said first and second sets of surface undulations are spaced apart from each other around a circumference of said length of flexible elongate thermoplastic material.

8. A thermoplastic baling strap according to 5, wherein said surface undulations comprise ribbed undulations extending in a direction transverse to a main length of said length of flexible elongate thermoplastic material.

9. A thermoplastic baling strap according to claim 5, wherein said surface undulations of one part of said strap operate in use to grip a surface of another part of said strap, or part of another strap, when said strap is knotted with itself, or with said part of another strap.

10. A thermoplastic baling strap according to claim 5, wherein said undulations comprise a plurality of recessed portions and a plurality of protruding portions.

11. A thermoplastic baling strap according to claim 5, wherein said undulations comprise a plurality of alternating ridges and valleys.

12. A thermoplastic baling strap, according to claim 5, in which said undulations repeat at a distance in the range 0.83 to 1.25 undulations per millimetre of length of said cable.

13. A thermoplastic baling strap, capable of being fastened by a baling machine, said thermoplastic baling strap having a thermoplastic polymer composition (ePET') comprising:

98-99% by weight of a thermoplastic polymer composition (ePET) comprising polyethylene terephthalate (PET) and 6%±2% by weight of polyethylene; and 1 to 2% by weight of a masterbatch composition comprising: polyethylene terephthalate (PET); one or more multifunctional acrylic oligomers; at least one Phthalocyanine-based nucleating agent; and high flow polyethylene.

14. A thermoplastic baling strap according to claim 1, wherein said 98-99% by weight of thermoplastic composition comprises recycled polyethylene terephthalate.

15. A method of manufacturing the thermoplastic baling strap recited in claim 1, said method comprising:

preparing a masterbatch of recycled polyethylene terephthalate (rPET) including one or more multi-functional acrylic oligomers to obtain a modified recycled polyethylene terephthalate;

combining said modified rPET with a phthalocyanine based nucleating agent;

transitioning said modified rPET from molten to solid state; and extruding said modified rPET material into an elongate band.

16. A method of manufacture according to claim 15, wherein said thermoplastic baling strap is a single length of flexible elongate thermoplastic material.

17. A method of manufacture of a thermoplastic baling strap according to claim 16, wherein said thermoplastic baling strap is fastened by a self-tying knot mechanism on the baling machine.

18. A method of manufacture of a thermoplastic baling strap according to claim 16, wherein said polyethylene terephthalate comprises 7% by weight of polyethylene.

19. A method of manufacture of a thermoplastic baling strap according to claim 16, wherein said one or more multi-functional acrylic oligomers are selected from the set hydroxylpropyl methacrylate, 2-hyrdoxylpropyl methacrylate, benzoylated hydroxylpropyl methacrylate.

20. A method of manufacturing a thermoplastic baling strap, into an elongate band according to claim 16, wherein said phthalocyanine based nucleating agent is selected from the set: Phthalocyanine Green G, Phthalocyanine Green 7.

21. A method of manufacture of a thermoplastic baling strap according to claim 16, wherein said transitioning of said modified rPET is controlled to solidify/solidifies at a temperature of between 220° C. to 260° C.

22. A method of manufacture of a thermoplastic baling strap according to claim 16, wherein said transitioning of said modified rPET is controlled to solidify/solidifies over a time period of between 20 and 35 seconds dependant on the external conditions at ambient temperature.

23. A method of manufacture of a thermoplastic baling strap according to claim 16, wherein said elongate band of modified rPET is extruded through a die under a tension of between 90 and 110 lbf/in2.

24. A method of manufacture of a thermoplastic baling strap according to claim 16, wherein said elongate band of modified rPET is extruded through a die under a pull force of between 320 and 400 N/mm.

25. A method of manufacture of a thermoplastic baling strap according to claim 16, further comprising passing said extruded elongate band, through a set of rollers to shape said elongate band to form a baling strap.

26. A method of manufacture of a thermoplastic baling strap according to claim 25, wherein said set of rollers have a surface comprising a plurality of undulations, which act to impress on said elongate band a plurality of said surface undulations.

* * * * *